US008364604B1

(12) United States Patent
Blatt et al.

(10) Patent No.: US 8,364,604 B1
(45) Date of Patent: Jan. 29, 2013

(54) SYSTEM AND METHOD FOR MANAGING LICENSES

(75) Inventors: Elliot Blatt, Potomac, MD (US); Wei Liu, Great Falls, VA (US)

(73) Assignee: ArdentSky, LLC, Potomac, MD (US)

( * ) Notice: Subject to any disclaimer, the term of this patent is extended or adjusted under 35 U.S.C. 154(b) by 531 days.

(21) Appl. No.: 12/619,291

(22) Filed: Nov. 16, 2009

Related U.S. Application Data

(60) Provisional application No. 61/115,321, filed on Nov. 17, 2008.

(51) Int. Cl.
*G06Q 99/00* (2006.01)
(52) U.S. Cl. ........................................................ 705/317
(58) Field of Classification Search .................. 715/224, 715/225; 705/317
See application file for complete search history.

(56) References Cited

U.S. PATENT DOCUMENTS

| | | | | |
|---|---|---|---|---|
| 5,450,537 A * | 9/1995 | Hirai et al. | ..................... | 715/200 |
| 5,774,887 A * | 6/1998 | Wolff et al. | ........................... | 1/1 |
| 6,199,079 B1 * | 3/2001 | Gupta et al. | .................. | 715/207 |
| 6,345,278 B1 * | 2/2002 | Hitchcock et al. | ..................... | 1/1 |
| 6,490,601 B1 * | 12/2002 | Markus et al. | ................. | 715/207 |
| 6,950,981 B2 * | 9/2005 | Duffy et al. | .................... | 715/222 |
| 7,409,632 B1 * | 8/2008 | DiRienzo | ...................... | 715/226 |
| 7,469,214 B2 * | 12/2008 | Martin et al. | ..................... | 705/4 |
| 7,669,116 B2 | 2/2010 | Lopata et al. | | |
| 7,821,666 B2 * | 10/2010 | Double | ........................ | 358/1.18 |
| 7,870,477 B2 * | 1/2011 | Perelman et al. | ............. | 715/221 |
| 8,103,596 B1 * | 1/2012 | McFarlin et al. | ............... | 705/59 |
| 2001/0032215 A1 * | 10/2001 | Kyle et al. | ...................... | 707/505 |
| 2002/0016791 A1 * | 2/2002 | Palmer | ....................... | 707/104.1 |
| 2002/0028426 A1 * | 3/2002 | Pasant | ........................... | 434/118 |
| 2002/0152234 A1 * | 10/2002 | Estrada et al. | .................. | 707/501.1 |
| 2004/0015388 A1 * | 1/2004 | Royall et al. | .................... | 705/10 |
| 2004/0205531 A1 * | 10/2004 | Innes et al. | .................... | 715/507 |
| 2009/0292728 A1 * | 11/2009 | Aleixo | ........................ | 707/104.1 |
| 2011/0082809 A1 * | 4/2011 | Andapally | ..................... | 705/327 |

* cited by examiner

*Primary Examiner* — Traci Casler
(74) *Attorney, Agent, or Firm* — Edell, Shapiro & Finnan, LLC

(57) ABSTRACT

According to embodiments of the present invention, licenses for various industries are applied for and managed. Embodiments of the present invention provide for centralizing and standardizing the obtainment, completion, and submission of various license forms for applicants (e.g., any entity/person applying for, renewing, or otherwise requesting some type of license, renewal, extension, or other license related item) across plural jurisdictions. The license forms and other materials are collected from various sources. Embodiments of the present invention provide and maintain all relevant existing licenses or license applications, and further provide project management and calendar functions for licenses and license renewals. Users may be alerted when licenses require renewal, and/or license renewal date information may be integrated with user calendars. In addition, embodiments of the present invention generate attachments for license forms in the event the license form is unable to accommodate the amount of requested information being provided.

30 Claims, 21 Drawing Sheets

| Field Name | Data Type | Description |
|---|---|---|
| ID | AutoNumber | Unique record key |
| SSN | Text | Social Security Number |
| LNAME | Text | Last Name |
| FNAME | Text | First Name |
| MNAME | Text | Middle Name |
| SUFFIX | Text | Suffix (Jr., Sr.) |
| DOB | Date/Time | Date of Birth |
| POBCITY | Text | City of Birth |
| POBSTATE | Text | State of Birth |
| POBCOUNTY | Text | County of Birth |
| POBCOUNTRY | Text | Country of Birth |
| CPHONE | Text | Cell Phone |
| EMAIL | Text | Email |
| MADDRESS | Text | Mailing Address - Number and Street |
| MAPPT | Text | Mailing Address – Apt. or Flat |
| MCITY | Text | Mailing Address – City |
| MSTATE | Text | Mailing Address - State |
| MZIP | Text | Mailing Address - ZIP |
| SEX | Text | Sex |
| RACE | Text | Race |
| EYECOLOR | Text | Color of Eyes |
| HAIRCOLOR | Text | Hair Color |
| HEIGHTFT | Text | Height (feet) |
| HEIGHTIN | Text | Height (inches) |
| HEIGHTCM | Text | Height (centimeters) |
| WEIGHTLBS | Text | Weight (lbs) |
| WEIGHTKG | Text | Weight (kg) |
| COMPLEXION | Text | Complexion |
| BUILD | Text | Build |
| SPECIALMARKS | Text | Special marks, e.g., scars, tatoos, etc. |
| MARRIAGESTATUS | Text | Marriage Status |
| ALIMONYSTATUS | Text | Alimony Status |
| ISENGLISHFLUENT | Yes/No | Is English Fluent |
| EMPLOYEECLASS | Text | GEmployeeClass Glossary |
| USERID | Text | User Login |

FIG.4

| Query Name | Table/Query Name | SQL Statements | Input Parameter | Input Description | Input Default Value | Output Parameter | Output Formula | Output Description |
|---|---|---|---|---|---|---|---|---|
| FinAssetsResPrevious | | | | | | Purpose | | |
| FinAssetsResPrevious | | | | | | DownPayment | | |
| FinAssetsResPrevious | | | | | | OwnershipPercent | | |
| FinAssetsResPrevious | | | | | | OtherOwners | | |
| FinAssetsResPrevious | | | | | | PURCHASEPRICE | | |
| FinAssetsResPrevious | | | | | | RentalIncome | | |
| FinAssetsResPrevious | | | | | | MarketValue | | |
| FinAssetsResPrevious | | | | | | DispositionPrice | | |
| FinAssetsRetirement | FinAssetsRetirement | select * from FinAssetsRetirement where whorelation in (who) and CashValue > Amount | who | | SELF | whoname | | |
| FinAssetsRetirement | | | Amount | | 0 | whorelation | | |
| FinAssetsRetirement | | | | | | FundType | | |
| FinAssetsRetirement | | | | | | SecType | | |
| FinAssetsRetirement | | | | | | Description | | |
| FinAssetsRetirement | | | | | | InstitutionName | | |
| FinAssetsRetirement | | | | | | InstitutionFullAddress | | InstitutionAopt + " " + InstitutionCity + " " + InstitutionState + " " + InstitutionZip + " " + InstitutionCountry |
| FinAssetsRetirement | | | | | | InstitutionCountry | | |
| FinAssetsRetirement | | | | | | BrokerName | | |
| FinAssetsRetirement | | | | | | AccountNumber | | |
| FinAssetsRetirement | | | | | | AccountType | | |
| FinAssetsRetirement | | | | | | EmployeeContribution | | |
| FinAssetsRetirement | | | | | | EmployerContribution | | |
| FinAssetsRetirement | | | | | | CashValue | | |
| FinAssetsRetirement | | | | | | EffDate | | |
| FinAssetsSec | FinAssetsSec | select * from FinAssetsSec where whorelation in (who) and PurchaseDate > Today - NumYears and MarketValue > Amount | who | | SELF | whoname | | |
| FinAssetsSec | | | NumYears | | 100 | whorelation | | |
| FinAssetsSec | | | Amount | | 0 | PurchaseDate | | |
| FinAssetsSec | | | | | | SecType | | |
| FinAssetsSec | | | | | | InstitutionName | | |
| FinAssetsSec | | | | | | InstitutionFullAddress | | InstitutionAopt + " " + InstitutionCity + " " + InstitutionState + " " + InstitutionZip + " " + InstitutionCountry |

Click on a column filter item to filter employee records.

| First Name | Middle Name | Last Name | SSN | Date of Birth | |
|---|---|---|---|---|---|
| Joe | Walter | Doe | 123-45-6789 | 11/15/1968 | Delete |
| John | Fitzgerald | Kennedy | 114-57-2309 | 05/19/1917 | Delete |
| Marilyn | | Monroe | 132-63-8743 | 06/01/1926 | Delete |
| Francis | Albert | Sinatra | 113-74-3415 | 12/12/1915 | Delete |
| Dean | | Martin | 110-67-7834 | 06/07/1917 | Delete |
| Samuel | George | Davis | 123-34-5456 | 12/08/1925 | Delete |
| Peter | Sydney | Lawford | 115-34-2461 | 09/07/1923 | Delete |
| Joseph | | Bishop | 121-45-7567 | 02/03/1918 | Delete |
| Elvis | Aaron | Presley | | | Delete |
| Benjamin | | Siegel | | | Delete |
| Bruce | Frederick Joseph | Springsteen | | | Delete |
| Anita | Jane | Smith | | 01/01/2008 | Delete |

210

Search:

Page 1 of 1 (14 item:

Add Employee

| Employees | Forms | Personal | IDs | Residences | Family | Citizenships | Military | Education | Positions | Civil/Criminal | Financial | Miscellaneous |

Enter personal data

Civil/Criminal submenu:
- Criminal Proceedings
  - Offenses/Arrests
  - Charges
  - Courts
  - Dispositions/Sentences
- Civil Lawsuits
- Investigations
- Other Code Violations
- Bankruptcies

| Employees | Forms | Personal | IDs | Residences | Family | Citizenships | Military | Education | Positions | Civil/Criminal | Financial | Miscellaneous |

Joe Walter Doe, Sr.
Residences > Address

Beginning with your current residence(s) and working backward, provide the following information with respect to each place where you have lived (including residences while attending college or while in military service) during the past fifteen (15) years or since the age of 18, whichever is less.

| From | To | Number | Apt. | City | County | State | Zip | Country | Home Phone | Rental | Command |
|---|---|---|---|---|---|---|---|---|---|---|---|
| 06/02/2007 | | 12345 Main Street | | Las Vegas | | Nevada | 89108 | USA | (702)942-0001 | ☐ | Edit \| Delete |
| 05/30/2000 | 06/02/2007 | 4321 W Flamingo Road | #18 | Las Vegas | | Nevada | 89107 | USA | (702) 942-7778 | ☐ | Edit \| Delete |
| 04/01/1995 | 05/29/2000 | 323 E. Wacker Drive | | Chicago | | Illinois | 60601 | USA | 312-616-1030 | ☑ | Edit \| Delete |

FIG.10

| Jurisdiction | Type | Form | |
|---|---|---|---|
| Agua Caliente Band of Cahuilla Indians of the Agua Caliente Indian Reservation, California | State | Personal disclosure form | Generate |
| Ak Chin Indian Community of the Maricopa (Ak Chin) Indian Reservation, Arizona | State | Personal disclosure form | Generate |
| Alturas Indian Rancheria, California | State | Personal disclosure form | Generate |
| Apache Tribe of Oklahoma | State | Personal disclosure form | Generate |
| Arapahoe Tribe of the Wind River Reservation, Wyoming | State | Personal disclosure form | Generate |
| Arizona | Multiple | Application for State Certification | Generate |
| Assiniboine and Sioux Tribes of the Fort Peck Indian Reservation, Montana | State | Personal disclosure form | Generate |
| Augustine Band of Cahuilla Indians, California | State | Personal disclosure form | Generate |
| Bad River Band of the Lake Superior Tribe of Chippewa Indians of the | State | Personal disclosure form | Generate |
| Barona Group of Capitan Grande Band of Mission Indians of the Barona Reservation, California | Tribes | Gaming License Application | Generate |
| Barona Group of Capitan Grande Band of Mission Indians of the Barona Reservation, California | State | Personal disclosure form | Generate |
| Bay Mills Indian Community, Michigan | State | Personal disclosure form | Generate |
| Bear River Band of the Rohnerville Rancheria, California | State | Personal disclosure form | Generate |
| Berry Creek Rancheria of Maidu Indians of California | State | Personal disclosure form | Generate |
| Big Sandy Rancheria of Mono Indians of California | State | Personal disclosure form | Generate |

Page 1 of 16 (237 items)

MULTI JURISDICTIONAL CASINO/GAMING LICENSE
PERSONAL HISTORY DISCLOSURE FORM

PLEASE PRINT OR TYPE THE ANSWERS TO THE
FOLLOWING QUESTIONS IN THE SPACES PROVIDED

PERSONAL DATA

| NAME: LAST (INCLUDE SR. JR. ETC. IF APPLICABLE) | FIRST | MIDDLE | |
|---|---|---|---|
| Doe Sr. | Joe | Walter | |

| MAILING ADDRESS/POSTAL ADDRESS: NUMBER AND STREET | APT #/FLAT # | CITY/TOWN | STATE/PROVINCE | ZIP/POSTAL CODE |
|---|---|---|---|---|
| 12345 Main Street | | Las Vegas | NV | 89103 |

| HOME ADDRESS: (IF DIFFERENT THAN MAILING ADDRESS/POSTAL ADDRESS) NUMBER AND STREET | APT #/FLAT # | CITY/TOWN | STATE/PROVINCE | ZIP/POSTAL CODE |
|---|---|---|---|---|
| 12345 Main Street | | Las Vegas | NV | 89108 |

| PRESENT BUSINESS ADDRESS: NUMBER AND STREET | APT #/FLAT # | CITY/TOWN | STATE/PROVINCE | ZIP/POSTAL CODE |
|---|---|---|---|---|
| Wall Street | 111 | New York | NY | 11218 |

| HOME TELEPHONE NUMBER: (AREA CODE) | (NUMBER) | CURRENT BUSINESS TELEPHONE NO. AT PLACE OF EMPLOYMENT: (AREA CODE) (NUMBER) (EXTENSION) | | FAX NUMBER: (AREA CODE) | (NUMBER) |
|---|---|---|---|---|---|
| (702) | 942-0001 | (123) | 456-7890 | (987) | 654-3210 |

| DATE OF BIRTH: (MO/DAY/YEAR) | E-MAIL ADDRESS (OPTIONAL): |
|---|---|
| 11/15/1968 | joe@doe.com |

HAVE YOU BEEN KNOWN BY ANY OTHER NAME OR NAMES? YES ☒ NO ☐ IF YES, LIST THE ADDITIONAL NAMES BELOW AND SPECIFY DATES OF USE FOR EACH. (INCLUDE MAIDEN NAME, ALIASES, NICKNAMES, OTHER NAME CHANGES, LEGAL OR OTHERWISE.)

| 07/01/2006 | 07/11/2008 | Joe the Gaming Executive (Alias) |
|---|---|---|
| 05/01/2006 | 06/30/2006 | Joey Knuckles Doe (Alias) |
| | | |

| SEX | COLOR OF EYES | COLOR OF HAIR | HEIGHT | | | | WEIGHT | | |
|---|---|---|---|---|---|---|---|---|---|
| Male | Black | Bald | 6 | FT / 2 | IN / 185 | CM | 190 | LBS / 86 | KG |

DO YOU HAVE ANY SCARS, TATOOS, OR OTHER DISTINGUISHING MARKS AND/OR CHARACTERISTICS? IF SO, PLEASE DESCRIBE
Scar on left cheek, butterfly-shaped birthmark on bottom, MOM tatoo on left arm

FIG.11A

CASINO KEY EMPLOYEE/QUALIFIER FORM
PERSONAL HISTORY DISCLOSURE FORM (BASIC KEY FORM)

OFFICIAL USE ONLY

| 1. CCC | 2. CCC | 3. DGE |

PLEASE PRINT OR TYPE THE ANSWERS TO THE FOLLOWING QUESTIONS IN THE SPACES PROVIDED

NAME: LAST (INCLUDE SR, JR, ETC. IF APPLICABLE) — Doe Sr.  FIRST — Joe  MIDDLE — Walter MAILING ADDRESS: (NUMBER AND STREET) — 12345 Main Street  (APT#)  (CITY) — Las Vegas  (STATE) — NV  (ZIP CODE) — 89103

HOME ADDRESS: (IF DIFFERENT THAN MAILING ADDRESS) (NUMBER AND STREET) — 12345 Main Street  (APT#)  (CITY) — Las Vegas  (STATE) — NV  (ZIP CODE) — 89108

HOME TELEPHONE NUMBER: (AREA) (702) 942-0001  TELEPHONE NUMBER AT CURRENT PLACE OF EMPLOYMENT: (AREA) (123) 456-7890  EXTENSION:

DATE OF BIRTH: (MO)(DAY)(YEAR) — 11/15/1968   HEIGHT (FT-IN) — 6  2   WEIGHT (LBS) — 190   SOCIAL SECURITY NUMBER: 123-45-6789

HAVE YOU BEEN KNOWN BY ANY OTHER NAME OR NAMES? YES ☒ NO ☐  IF YES, LIST THE ADDITIONAL NAMES BELOW AND SPECIFY DATES OF USE FOR EACH. (INCLUDE MAIDEN NAME, ALIASES, NICKNAMES OR ANY OTHER NAME.)

07/01/2006  07/11/2008  Joe the Gaming Executive (Alias)
05/01/2006  06/30/2006  Joey Knuckles Doe (Alias)

PLEASE CHECK OR COMPLETE APPROPRIATE SPACE

| HAIR COLOR: | EYE COLOR: | SEX:*** | RACE:*** |
|---|---|---|---|
| ☒ (BK) BLACK | ☒ (BK) BLACK | ☒ (M) MALE | ☐ (C) CAUCASIAN |
| ☐ (BR) BROWN | ☐ (BR) BROWN | ☐ (F) FEMALE | ☒ (B) BLACK |
| ☐ (BD) BLOND | ☐ (HZ) HAZEL | | ☐ (H) HISPANIC |
| ☐ (RD) RED | ☐ (BL) BLUE | | ☐ (A) ASIAN |
| ☐ (GY) GRAY | ☐ (GY) GRAY | | ☐ (N) NATIVE AMERICAN |
| ☐ (WH) WHITE | ☐ (GR) GREEN | | |
| ☒ (BA) BALD | | | |

FIG. 11B

Home > Project Calendar

Corporate Project Calendar

| Employee / Entity | Jurisdiction | Agency / Authority | Expiration Date | Project End Date | Manager | Status |
|---|---|---|---|---|---|---|
| ▸ Lottomatica | Absentee-Shawnee Tribe of Indians of Oklahoma | | | | | |
| Joe Walter Doe, Sr. | Comanche Nation, Oklahoma | Comanche Nation Gaming Control Board | 09/12/2009 | | Alex A. Ortiz | ▬ |
| Joe Walter Doe, Sr. | Delaware Nation, Oklahoma | Delaware Nation Gaming Board | 08/08/2009 | | Mike Liu | ▬ |
| John Fitzgerald Kennedy | Louisiana | Louisiana Gaming Control Board | 05/30/2009 | | Elliot Blatt | ▬ |
| Marilyn Monroe | Louisiana | Louisiana Gaming Control Board | 05/11/2009 | | Elliot Blatt | ▬ |
| Marilyn Monroe | Miami Tribe of Oklahoma | Miami Tribe of Oklahoma Authority | 05/10/2009 | | Alex A. Ortiz | ▬ |
| John Fitzgerald Kennedy | Michigan | Michigan Gaming Control Board | 05/06/2009 | | Joe W. Doe | ▬ |
| Marilyn Monroe | Michigan | Michigan Gaming Control Board | 05/13/2009 | | Elliot Blatt | ▬ |
| Marilyn Monroe | Missouri | Missouri Gaming Control Board | 05/30/2009 | | Mike Liu | ▬ |
| John Fitzgerald Kennedy | Nevada | Nevada Gaming Control Board | 05/10/2009 | | Alex A. Ortiz | ▬ |
| Marilyn Monroe | New Jersey | New Jersey CCC | 02/11/2009 | | Alex A. Ortiz | ▬ |
| Joe Walter Doe, Sr. | Pala Band of Luiseno Mission Indians of the Pala Reservation, California | Gaming Agency | 05/13/2010 | | Alex A. Ortiz | ░ |

Joe Walter Doe, Sr.
Home > Miscellaneous > Compliance Calendar

| Employees | Forms | Personal | IDs | Residences | Family | Citizenships | Military | Education | Positions | Licenses | Civil/Criminal | Financial | Miscellaneous | Reports |

The table below includes all personal licenses set to expire within the next 40 days. Click on the [Send Reminder] button on the bottom to send an email and calendar reminder.

| Jurisdiction | Agency / Authority | Number | Expiration Date |
|---|---|---|---|
| New Jersey | NJ | 6789 | 05/14/2009 |
| Barona Group of Capitan Grande Band of Mission Indians of the Barona Reservation, California | Barona | B1234 | 05/14/2009 |
| Arizona | Arizona | AR-2101 | 05/13/2009 |
| Apache Tribe of Oklahoma | Apache Tribal Agency | O-1767 | 05/19/2009 |
| Cherokee Nation, Oklahoma | Cherokee Nation Gaming Control Board | CHGCB-0102 | 05/14/2009 |
| Cocopah Tribe of Arizona | Cocopah Tribe Gaming Control Board | COC-834 | 06/09/2009 |
| Delaware Nation, Oklahoma | Delaware Nation Gaming Board | DNG-4567 | 05/30/2009 |
| Pala Band of Luiseno Mission Indians of the Pala Reservation, California | Gaming Agency | 123456-44 | 05/13/2009 |
| Seneca Nation of New York | Seneca Nation | SN762-902 | 05/13/2009 |
| Twenty-Nine Palms Band of Mission Indians of California | 29 Palms | 29P-9968 | 05/13/2009 |
| Santa Ysabel | Santa Ysabel Gaming Licensing Authority | Dis-2109 | 05/01/2009 |

Page 1 of 1 (11 items)

[Send Reminder]

© Copyright 2009, AvdenBiv, LLC All Rights Reserved. Patent Pending.

FIG.13A

Multiplication Table
                                                                    Date: X/XX/XXXX
                                                                    Page 1
Attachments:

Page: 12 Question: 23

| Application Date | Disposition | Agency | Status |
|---|---|---|---|
| 9/13/2006 | Granted | Santa Ysabel Gaming Licensing Authority, 1 Santa Ysabel Drive, Santa Ysabel, San Diego, CA, USA | |
| 9/13/2008 | Denied | | |
| 9/13/2006 | Conditional | Barona, 111 Barona St., San Diego, CA, USA | |
| 9/13/2006 | Approved | NJ, Atlantic Ave, Atlantic City, NJ, USA | |
| 9/14/2008 | Approved | Apache Tribal Agency, OK, USA | |
| 9/2/1997 | Approved | Arizona, 202 East Earll Drive, Suite 200, Phoenix, AZ, USA | |
| 7/6/1999 | Approved | Alturas Indian Gaming Control Board, CA, USA | |
| 2/25/2000 | Approved | Delaware Nation Gaming Board, OK, USA | |
| 9/14/2004 | Approved | Gaming GCB, LA, USA | |
| 4/3/2004 | Approved | Cherokee Nation Gaming Control Board, OK, USA | |
| 8/13/2004 | Approved | Chickasaw Nation Gaming Control Board, OK, USA | |
| 8/6/2001 | Approved | Comanche Nation Gaming Control Board, OK, USA | |
| 6/6/2001 | Approved | Cocopah Tribe Gaming Control Board, AZ, USA | |
| 9/13/2007 | Approved | 29 Palms, CA, USA | |
| 6/22/2008 | Approved | Seneca Nation, NY, USA | |
| 6/20/2006 | Granted | Ho Chunk, CA, USA | |
| 2/10/2007 | Granted | Ho Chunk, CA, USA | |

FIG.14B

SYSTEM AND METHOD FOR MANAGING LICENSES

CROSS-REFERENCE TO RELATED APPLICATIONS

This application claims priority from U.S. Provisional Patent Application Ser. No. 61/115,321, entitled "Methods and Systems for Automating License Management Processes for the Gaming and Pharmaceuticals Industries" and filed Nov. 17, 2008, the disclosure of which is incorporated herein by reference in its entirety.

BACKGROUND

1. Technical Field

The present invention embodiments pertain to license management. In particular, the present invention embodiments pertain to management of applying for and renewing licenses.

2. Discussion of Related Art

Manufacturers and operators, for example, in the gaming and pharmaceutical industries, etc. are required to obtain, complete, and submit a variety of license application forms (e.g., company licensing application forms, key employee licensing application forms, technical representative licensing application forms, etc.) in order to apply for and obtain an appropriate license for the corresponding industry. These license applications must be obtained from and submitted to various distinct regulatory authorities on a regular, periodic basis. The licensing application forms may only be available in certain formats (e.g., paper, MSWord, ADOBE .pdf, etc.), and may require extremely detailed background information, where some forms request in excess of sixty pages of information. License applicants must type or write similar information each time a form is completed. This process may be repeated more than one hundred times for a single applicant.

Applicants subject to the licensing requirements are obliged to ensure that the most current version of any particular license application is utilized, and be aware of corresponding laws and regulations. Since many licenses are renewable and require disclosure of other licenses, licensees must track renewal dates for all personal and corporate licenses and be able to generate a complete list of preexisting license applications for each new application.

SUMMARY

According to embodiments of the present invention, licenses for various industries (e.g., pharmaceutical, gaming, etc.) are applied for and managed. Embodiments of the present invention provide for centralizing and standardizing the obtainment, completion, and submission of various license forms (e.g., license applications, license renewals, etc.) for applicants (e.g., any entity/person applying for, renewing, or otherwise requesting some type of license, renewal, extension, or other license related item) across plural jurisdictions. The license forms and other materials (e.g., constitutions, compacts, laws, regulations, decisions, rulings, etc.) are collected from various sources, where relevant compliance information is aggregated by jurisdiction. License forms for certain jurisdictions may require disclosure of all license applications in other jurisdictions. Embodiments of the present invention provide all relevant existing licenses or license applications. Further, embodiments of the present invention provide project management and calendar functions for licenses and license renewals. Users may be alerted when licenses require renewal, and/or license renewal date information may be integrated with user calendars. In addition, embodiments of the present invention generate attachments for license forms in the event the license form is unable to accommodate the amount of requested information being provided.

The above and still further features and advantages of the present invention will become apparent upon consideration of the following detailed description of example embodiments thereof, particularly when taken in conjunction with the accompanying drawings wherein like reference numerals in the various figures are utilized to designate like components.

BRIEF DESCRIPTION OF THE DRAWINGS

FIG. 4 is an illustration of an example configuration for a database table including personal information for license applicants according to an embodiment of the present invention.

FIG. 5 is an illustration of an example table defining database queries for ascertaining information for license form fields from a database according to an embodiment of the present invention.

FIG. 6 is an illustration of an example table mapping license form fields to database queries to ascertain information for those fields from a database according to an embodiment of the present invention.

FIG. 8 is an illustration of an example graphical user interface screen providing information pertaining to potential license applicants according to an embodiment of the present invention.

FIGS. 9A-9D are illustrations of example graphical user interface screens providing information for a selected potential license applicant according to an embodiment of the present invention.

FIG. 10 is an illustration of an example graphical user interface screen enabling selection of a desired license form according to an embodiment of the present invention.

FIGS. 11A-11B are illustrations of example license forms generated by an embodiment of the present invention.

FIG. 12A is an illustration of an example graphical user interface screen enabling management of license projects according to an embodiment of the present invention.

FIG. 12B is an illustration of an example graphical user interface screen enabling information entry for a license project according to an embodiment of the present invention.

FIG. 13A is an illustration of an example graphical user interface screen providing information pertaining to renewal of licenses according to an embodiment of the present invention.

FIG. 14B is an illustration of an example license form attachment according to an embodiment of the present invention.

DETAILED DESCRIPTION OF EXAMPLE EMBODIMENTS

Manufacturers and operators in various industries (e.g., casino gaming, pharmaceutical, etc.) are required to obtain, complete, and submit a variety of license forms (e.g., company licensing application forms, key employee licensing application forms, technical representative licensing application forms, license renewal forms, etc.) in order to apply for, obtain, and/or renew an appropriate license. An applicant may repeat the process numerous times.

Embodiments of the present invention increase operation efficiencies by reducing the burden of obtaining, completing, and submitting license forms. The present invention embodiments enable users to maintain data concerning license applicants in a central database, and automatically generate license forms appropriate to various jurisdictions in which an applicant conducts business. A compliance calendar alerts users prior to license renewal dates to enable generation of license renewal forms. Further, lists of licenses and applications for each entity are generated and maintained which may be requested as parts of other license forms. In addition, embodiments of the present invention generate attachments for license forms in the event a license form is unable to accommodate the amount of requested information being provided. Accordingly, users will no longer have to contact authorities in multiple jurisdictions to obtain current license forms, nor complete paper forms manually.

Figure 1A:
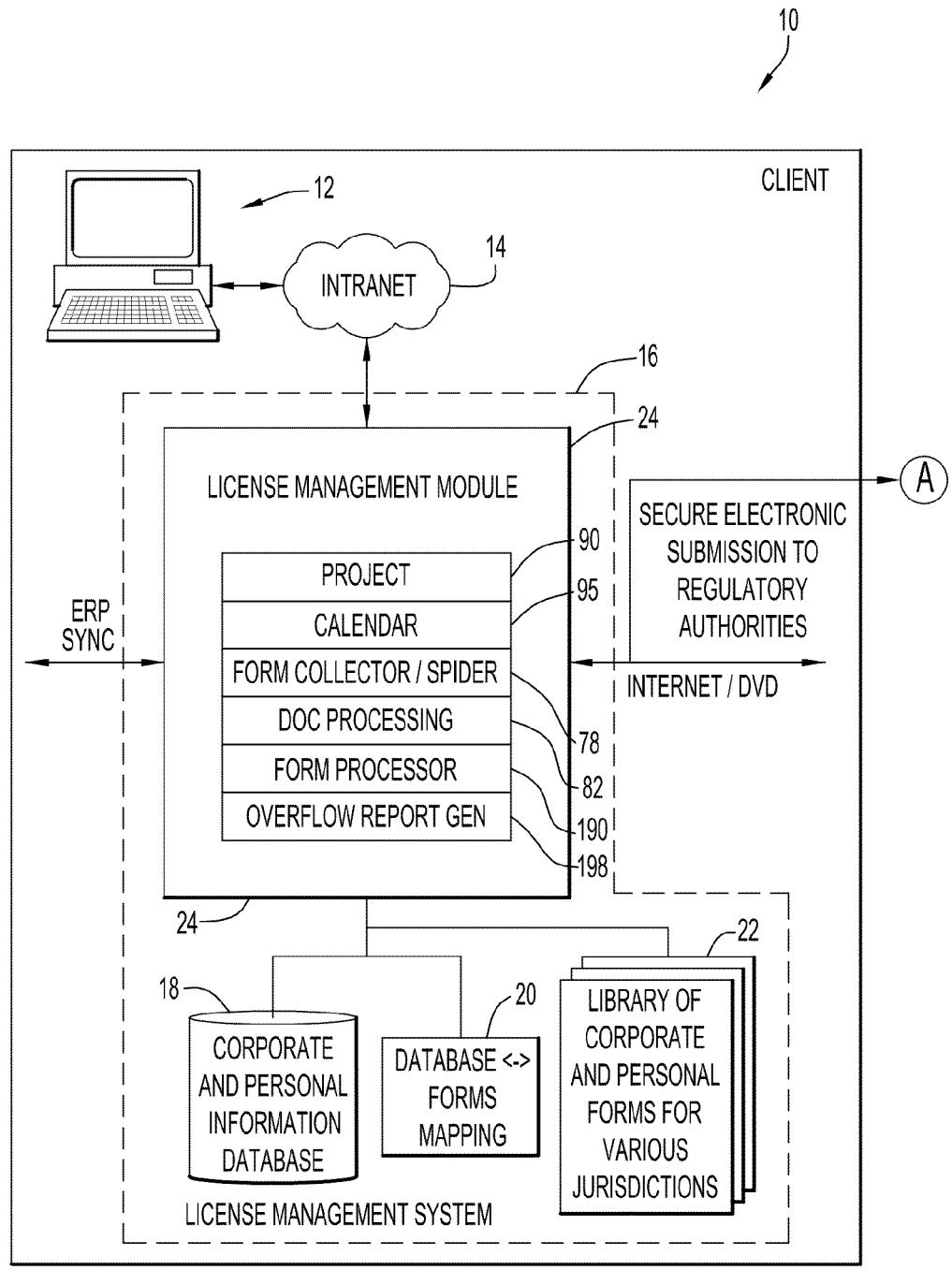
FIGS. 1A-1B are a block diagram of an example network topology employed by an embodiment of the present invention for license management.
Figure 1B:
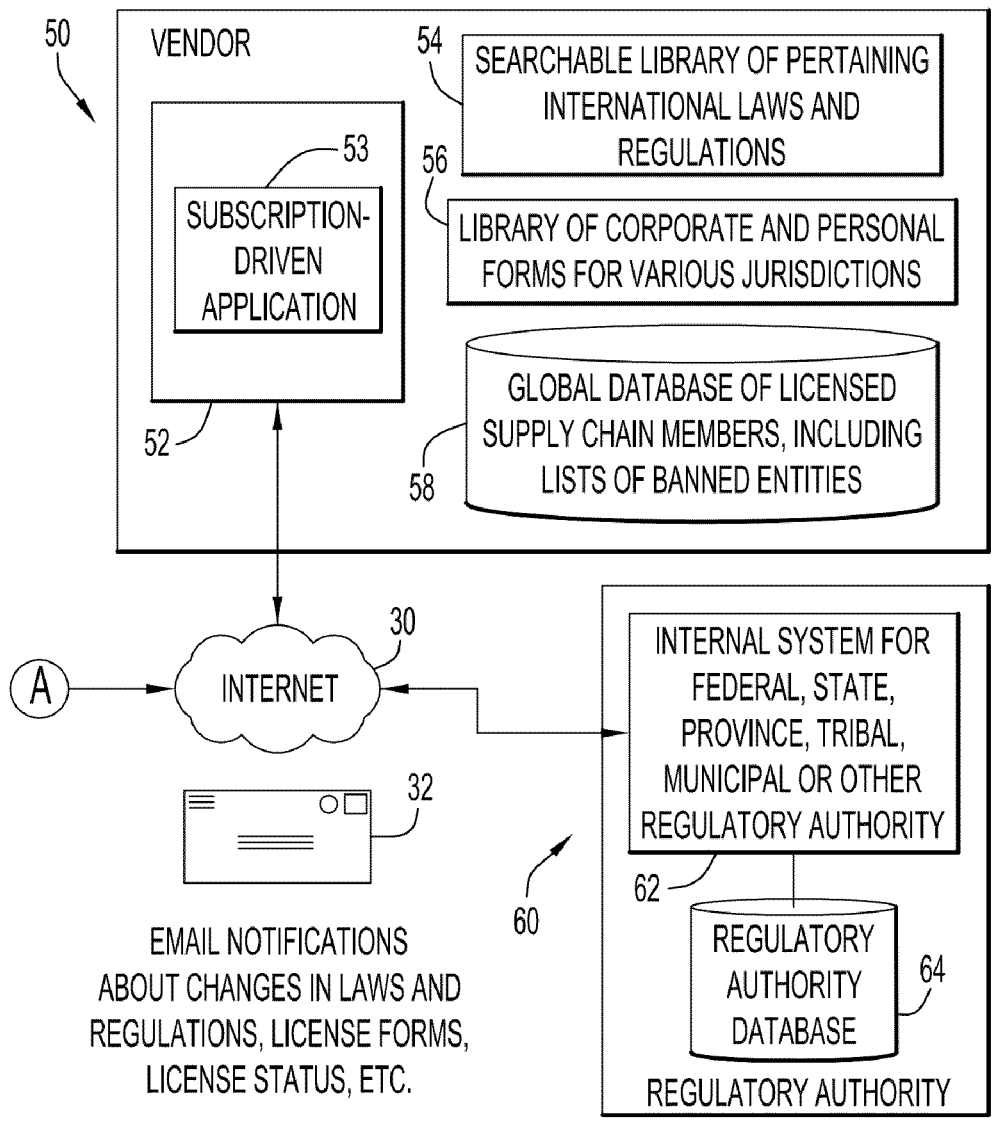

An example network topology including a system for managing licenses according to an embodiment of the present invention is illustrated in FIGS. 1A-1B. Specifically, the topology includes a client site 10, a vendor site 50, and a regulatory authority site 60. The sites are in communication with each other via a network 30. The network is preferably implemented by the Internet, but may be implemented by any quantity of any suitable communications media (e.g., WAN, LAN, Internet, Intranet, etc.).

Client site 10 includes an end-user or client computer system 12, and a license management system 16. The end-user and license management systems are coupled via a network 14, and may be implemented by any conventional or other computer systems preferably equipped with a display or monitor, a base (e.g., including the processor, memories and/or internal or external communications devices (e.g., modem, network cards, etc.)) and optional input devices (e.g., a keyboard, mouse or other input device). Network 14 is preferably implemented by an Intranet or Local Area Network (LAN), but may be implemented by any quantity of any suitable communications media (e.g., WAN, LAN, Internet, Intranet, etc.).

License management system 16 includes a license management module 24 to provide license management according to an embodiment of the present invention. The license management module includes or is coupled to an information database 18, a forms mapping store 20, and a forms library 22. By way of example only, license management module 24 is implemented as a IIS/.Net application, but may implemented by any suitable hardware and/or software modules. Information database 18, forms mapping store 20, and forms library 22 may be implemented by any suitable databases or other storing units or structures (e.g., files, directories, data structures, databases, memories, etc.). Information database 18 typically includes corporate, personal, and/or other license related information, while forms mapping store 20 includes information to enable retrieval of appropriate information for fields of a license form. Forms library 22 includes corporate and personal forms for various jurisdictions.

Vendor site 50 includes a vendor computer system 52 with a subscription driven module 53. The subscription driven module may be implemented by any suitable hardware and/or software modules. The vendor computer system may be implemented by any conventional or other computer system preferably equipped with a display or monitor, a base (e.g., including the processor, memories and/or internal or external communications devices (e.g., modem, network cards, etc.)) and optional input devices (e.g., a keyboard, mouse or other input device). The subscription driven module includes or is coupled to a law library 54, a forms library 56, and a database 58. Libraries 54, 56 and database 58 may be implemented by any suitable databases or other storing units or structures (e.g., files, directories, data structures, databases, memories, etc.). Law library 54 typically includes information pertaining to international laws and regulations, while forms library 56 includes corporate and personal forms from various jurisdictions. Database 58 is preferably a global database of licensed supply chain members, including lists of banned entities.

Regulatory information germane to license requirements may be consolidated within the libraries and database, where libraries 54, 56, and database 58 contain searchable information. The subscription driven module communicates with license management system 16 via network 30, and enables subscribers of vendor computer system 52 to search the information (e.g., via license management system 16 and/or end-user system 12). Libraries 54, 56, and/or database 58 may alternatively be deployed at client site 10, either individually or in any combinations.

Regulatory authority site 60 includes an authority computer system 62. The regulatory authority may be any suitable authority providing licenses (e.g., Federal, State, Province, Tribal, Municipal, etc.). The authority computer system may be implemented by any conventional or other computer system preferably equipped with a display or monitor, a base (e.g., including the processor, memories and/or internal or external communications devices (e.g., modem, network cards, etc.)) and optional input devices (e.g., a keyboard, mouse or other input device). The authority computer system includes or is coupled to an authority database 64, typically containing license forms and other related information.

Authority computer system 62 may communicate with vendor computer system 52 and license management system 16 via network 30. The authority computer system enables access to authority database 64 in order for the vendor computer system and/or license management system to retrieve appropriate license forms and other information. The authority computer system may generate electronic mail notifications 32 for transmission to vendor computer system 52 and/or license management system 16. The notifications may indicate the existence of changes to: laws and regulations; license forms; and license status. The vendor computer system may receive the notifications, and retrieve the updated information from the regulatory authority. This information may be accessed by the license management and/or client systems (e.g., the vendor computer system may further provide electronic mail notifications to alert users of the changes). Alternatively, the license management system may receive the electronic mail notifications from the authority computer system, and directly communicate with that system to retrieve the information.

License management module 24 (and information database 18, forms mapping store 20, and forms library 22) may generate license forms for plural jurisdictions, and communicate with other systems for transfer of information. For example, license management module 24 may communicate with ERP systems using standard data interfaces to exchange information (e.g., from a Human Resources ERP module, etc.). The license management module may further submit a secure electronic license form directly to regulatory authorities (e.g., via the Internet or other network, physical media (e.g., DVD, CD ROM, etc.), etc.).

Security is designed into the topology based on the license management system residing at client site 10, and allowing client system 12 to communicate with license management system 16 via network 14. Further, form files may be encrypted to prevent their content from unauthorized access during transmission over networks 14 and/or 30, or in storage archives. The encryption may be accomplished via any conventional or other encryption techniques.

License management module 24 may archive completed license forms in a searchable and retrievable format. Further, the license management module may include a calendar module 95 that provides a compliance calendar to inform users of upcoming requirements to renew licenses. Notices may occur within the user calendar, and/or users may receive electronic mail notifications about changes in laws and regulations, license status, license forms and other relevant compliance activities from vendor computer system 52 (or authority computer system 62) as described above. Moreover, license management module 24 may further include a project module 90 to provide license project management. In this case, the license management system enables automatic identification of licenses that are set to expire, and measures the workload of license project managers in order to most efficiently assign and track license projects. In addition, the license management system may enable users to research regulatory requirements (e.g., via communication with vendor computer system 52 and law library 54), and check licensing requirements for banned entities (e.g., via communication with vendor computer system 52 and database 58).

With respect to casino gaming by way of example, more than ten U.S. States and more than 250 federally recognized Native American tribes allow legalized gaming. All or most of these authorities require persons and companies involved in the gaming industry to submit a variety of license forms. These jurisdictions have similar, but distinct license forms (e.g., application, renewal, etc.) that are collected in various manners. Some license forms may be obtained from Internet Web sites, while other forms must be manually requested from the specific authority (e.g., via telephone, electronic mail, letter, facsimile, etc.). Certain authorities (e.g., States, etc.) must provide the requested information by law (e.g., Freedom of Information Act). However, other authorities (e.g., Native American tribes, etc.) may not be subject to these laws, and may not comply with requests for information. In this case, a consortia among these types of authorities may be established to encourage information sharing (with a direct information benefit to each participant). Alternatively, manufacturers may provide authorization to act on behalf of the manufacturer when interacting with these types of authorities.

Figure 2:
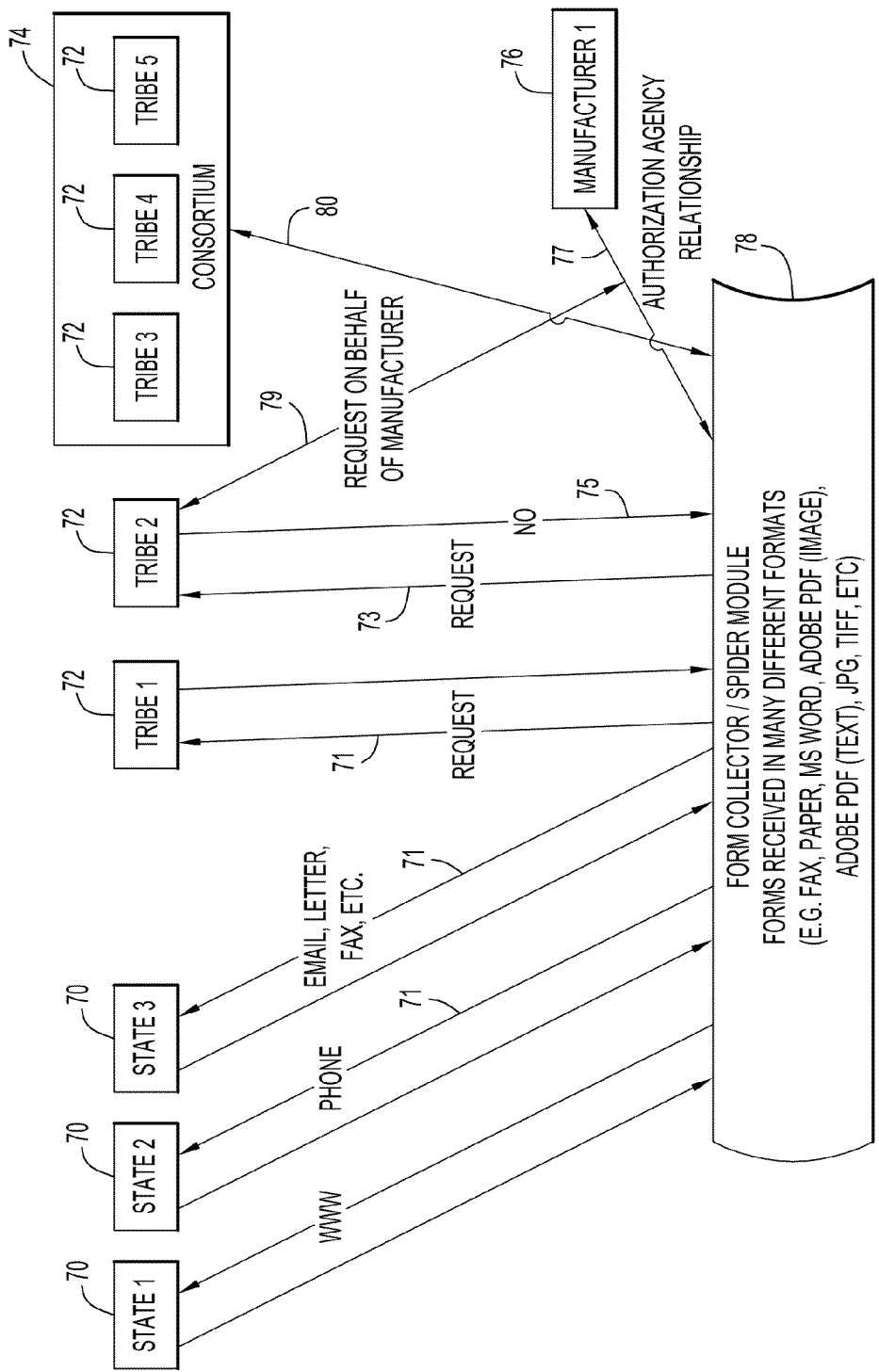
FIG. 2 is a flow diagram illustrating the manner in which license forms are obtained across varying jurisdictions according to an embodiment of the present invention.

Accordingly, an embodiment of the present invention ascertains license applications from various jurisdictions or authorities as illustrated in FIG. 2. Specifically, a form collector 78 is coupled to or in communication with various authorities or other sources of license forms. By way of example only, the sources of the license forms include States 70, Tribes 72, and a Tribe consortium 74. The forms collector may further be in communication with a manufacturer 76 to receive authorizations as described below.

In some instances, States 70 and Tribes 72 may publish gaming license forms on their Internet sites (e.g., "WWW" as viewed in FIG. 2). In these cases, license management system 16 (FIG. 1A) may retrieve the license forms and other information from those sites, where modifications to license forms and/or new versions of license forms are identified and collected. Specifically, license management module 24 includes a form collector 78 in the form of a spider module to automatically collect license forms and/or any other regulatory documents published on the Internet. Spider module 78 may be implemented by any suitable hardware and/or software modules. The spider module receives input including a list of Internet addresses (e.g., Uniform Resource Locators (URL)) to be monitored. The list of URLs provided to the spider module preferably includes URLs for license forms. The spider module periodically traverses the input URL addresses and any children URLs to which the input URLs refer. For each accessed URL, the spider module calculates a checksum or signature for the corresponding file (e.g., using SHA hashing algorithms developed by NIST (National Institute of Standards and Technology), etc.). The accessed URL and the corresponding signature are stored in information database 18 or other storage unit for the purpose of forms management. If a file signature changes (or is not present in information database 18 and/or forms library 22 in the case of a new form), the spider module downloads the new file (e.g., into forms library 22), updates the signature, and transmits an electronic mail notification to a system administrator using a pre-configured electronic mail address.

Alternatively, the spider module may retrieve and manage other information in substantially the same manner described above. For example, the list of URLs may direct the spider module to regulatory documents on the Internet (e.g., laws, regulations, regulatory news, regulatory decisions, tribe compacts, tribe constitutions, financial reports, lists of licensed entities, black lists of entities that are banned from certain activities, product and technical information, standards, and other documents published by the official authorities or other entities on the Internet) for the purposes of monitoring, document management, and regulatory compliance.

With respect to the situation where the authority does not publish the forms on the Internet, or has no legal obligations to provide the information, an approach according to an embodiment of the present invention includes requesting the information from the authority. For example, an applicant seeking a license from State and Tribal authorities initially searches the information, and subsequently provides requests 71 via telephone, electronic mail, letters, and facsimile (e.g., "PHONE" and "EMAIL, LETTER, FAX, ETC." as viewed for States 2 and 3 in FIG. 2; and "REQUEST" as viewed for Tribe 1 in FIG. 2). The corresponding authority provides the requested license forms and other related information to forms collector 78 in response to the requests. The requested forms may be provided to forms collector 78 via automated or manual techniques, and in various formats (e.g., electronic mail, facsimile, ground mail, word processing file, ADOBE .pdf image or text file, .jpg, .tiff, etc.). In this case, the forms collector may be in the form of a user contacting the authority, where the license forms may be received manually by the user, or electronically via (e.g., forms collector module 78 of) license management system 16.

In some instances, certain authorities may not provide license forms, even after repeated requests. In this case, agency relationships may be established with other licensed parties (e.g., gaming equipment manufacturers, etc.). For example, forms collector 78 acts on behalf of a separate party already holding gaming licenses. By way of example, forms collector 78 provides a request 73 (e.g., "REQUEST" as viewed in FIG. 2) for a license form to a Tribe 72 (e.g., Tribe 2 as viewed in FIG. 2). The Tribe provides a request denial 75 (e.g., "NO" as viewed in FIG. 2) in response to the request. Licensed manufacturer 76 provides an authorization 77 (e.g., "AUTHORIZATION AGENCY RELATIONSHIP" as viewed in FIG. 2) for an agency relationship to forms collector 78, where the forms collector sends a request 79 ("REQUEST ON BEHALF OF MANUFACTURER" as viewed in FIG. 2) on behalf of licensed manufacturer 76 for the license form. The forms collector receives the requested license form. In this case, the forms collector may be in the form of a user contacting the licensed manufacturer and authority, where the license forms may be received manually by the user, or electronically via (e.g., forms collector module 78 of) license management system 16.

Alternatively, a consortium of authorities may be organized. For example, forms collector 78 may organize groups of Tribes 72 (e.g., Tribes 3, 4, and 5 as viewed in FIG. 2) into a consortium 74 in order to share information among Tribes and with the forms collector. Each tribe may benefit from having direct access to the license forms, and laws and regulations of other tribes, while the forms collector benefits by simplifying the license management process within the industry by facilitating communication amongst tribal authorities. In this case, forms collector 78 provides a request 80 to consortium 74 for the desired license forms. The forms collector receives the requested license forms. In this case, the forms collector may be in the form of a user contacting the consortium, where the license form's may be received manually by the user, or electronically via (e.g., forms collector module 78 of) license management system 16.

Figure 3:
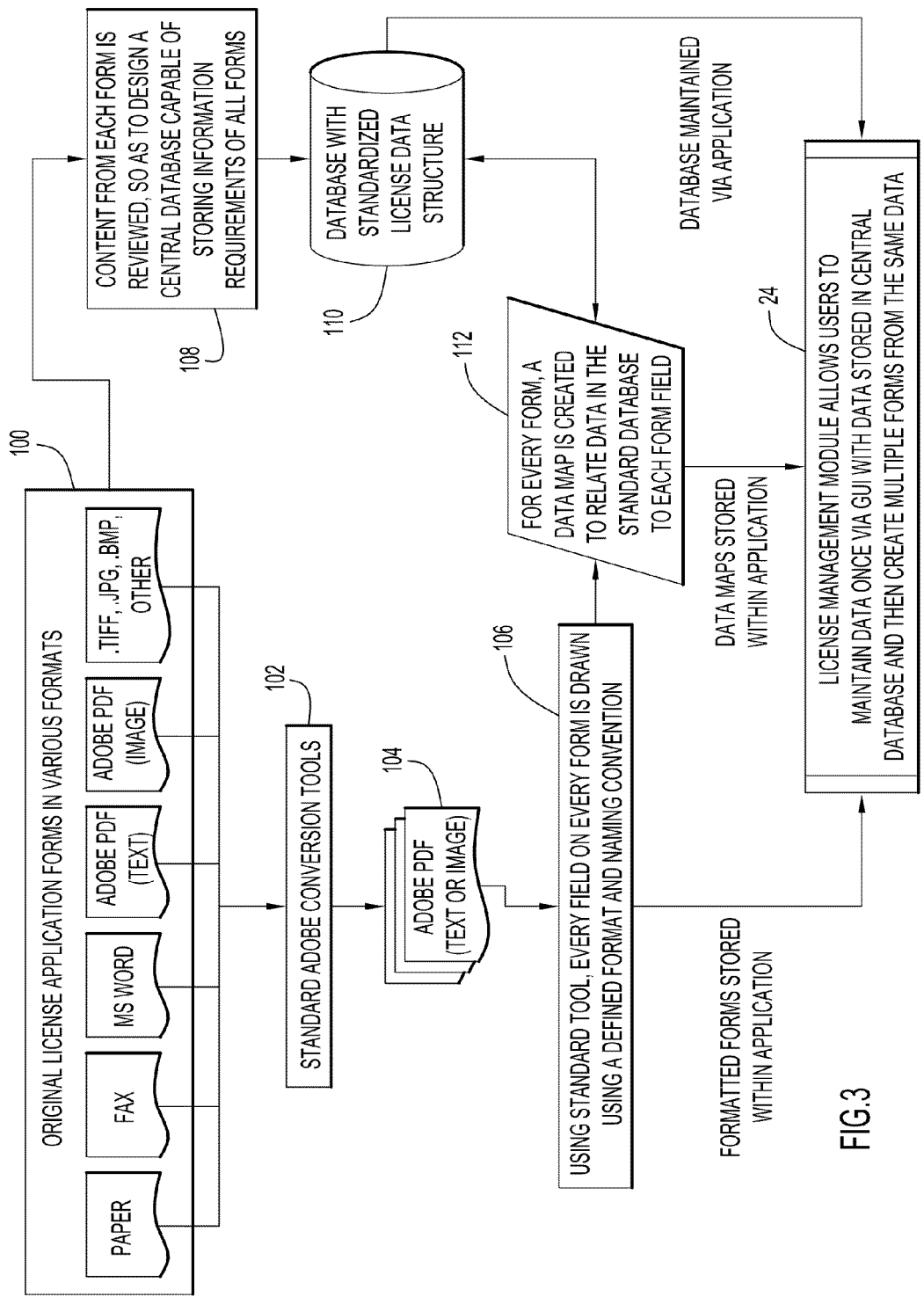
FIG. 3 is a flow diagram illustrating the manner in which license materials are formatted and evaluated for creating a data model to enable generation of various license forms according to an embodiment of the present invention.

The manner in which the license forms are processed by the license management system and evaluated according to an embodiment of the present invention is illustrated in FIG. 3. License management module 24 may include or be coupled to a document processing module 82 (FIG. 1A) that processes the collected license forms as described below. Initially, the license forms (e.g., license applications, license renewals, etc.) may be collected in various manners via form collector 78 as described above, and are stored in the license management system (e.g., in forms library 22). Collected license forms 100 may initially reside in various formats (e.g., original paper copies, faxed paper copies, MS Word or other word processing electronic files, ADOBE .pdf files (e.g., resident text or image formats), image formats .tif/.jpg/.bmp/.gif, etc.). The license forms are converted, via conversion tools 102, to a common document format 104, preferably ADOBE .pdf format (e.g., as image or text files within .pdf). Any conventional or other tools may be coupled to or included within the license management module and utilized to convert the license forms to the common document format.

The data entry fields on each license form are built or re-built via any conventional or other tools 106 (e.g., ADOBE Live Cycle Designer, etc.), where the tools may be coupled to or included within license management module 24. The data fields are established with a common format (e.g., common font size, type settings, nomenclature (e.g. based upon a data model and/or references to pages, sections, questions, etc.), etc.) to enable a simplified mapping process from a data field to a data model (or database structure) as described below. The standardized, formatted license forms may be stored within license management module 24 and/or forms library 22 (FIG. 1A) to enable the automated population of license form fields with data stored in information database 18. Alternatively, the standardized formatted license forms may be stored in a remotely hosted environment, where the license forms may be requested via conventional or other communication protocols (e.g., Internet based, etc.), and automatically populated with data from local information database 18 and/or a remote database local to the hosted environment.

Further, a detailed evaluation of the content of each license form may be performed at 108 to establish a single data model or structure for a central database capable of storing the informational requirements of all the license forms. Further, various information pertaining to the license forms and/or licenses may be retrieved and stored based on the evaluation (e.g., license renewal dates, duration of license, license expiration or expiration dates, type of license, etc.). This evaluation and generation of the data model may be performed manually, or by license management system 16. The data model is implemented at 110 in information database 18 (FIG. 1A), where license management application 24 maintains the information database. The evaluation is performed by reviewing and identifying the content and presentation style of each question on every license form. The identified styles are compared to the data model established to support all the previously reviewed license forms. The data model is amended in response to the comparison. This may be performed manually, or by license management system 16. For example, when a unique question appears on a particular license form, the data model may be amended to include a response for this unique inquiry. Similarly, if a question appears in two or more license forms, but requests a response in different manners, the manner in which data is maintained for a data element may be amended. By way of example, a license form may request the user to enter hair color as text, while another license form may request users to check an appropriate hair color from a list. In this case, the possible responses to the hair color question are reviewed in all applicable license forms, and the data model is amended to be capable of storing all possible responses. In addition, various glossaries for information database 18 are established.

Once the license forms are reviewed, a comprehensive data model for information database 18 is attained. By way of example, the data model may be in the form of one or more database tables each storing certain information pertaining to license applicants that are requested by the license forms. The configuration for an example database table containing personal information pertaining to license applicants is illustrated in FIG. 4. By way of example only, a personal table 120 includes personal information for license applicants, and a configuration with a row for each applicant and a series of columns storing different aspects of the personal information. An additional column is utilized for an identifier that serves as a key for the table. The name, data type, and description of each column of personal table 120 are respectively indicated by fields 122 (e.g., "Field Name"), 124 (e.g., "Data Type"), and 126 (e.g., "Description") in FIG. 4. The data model may include any quantity of database tables of similar configurations to store information to populate the fields of the license forms as described below.

Referring back to FIG. 3, a mapping layer is established at 112 to indicate a relationship between (or map) the fields of the license forms and information within information database 18. The mapping layer enables the storage of data once in the data model or information database 18, where plural license forms each with a distinct structure may be populated from a single instance of information stored within that database. The mapping layer is stored within forms mapping store 20, and is utilized by the license management module to extract the requested information from information database 18 and populate the fields of the license forms. The mapping layer includes a definition of standard, repeatable database queries, and a detailed mapping of each of the fields of the license forms to the information database. The mapping layer preferably employs standard database queries in most instances, and form-specific database queries when a license form requests unique information or information in a unique or different format.

The mapping layer may include a series of tables that defines database queries for the license forms, and maps the fields of the license forms to the database queries. An example query table utilized in the mapping layer to define database queries is illustrated in FIG. 5. In particular, query table 130 defines the various database queries utilized to retrieve information from information database 18 in order to populate a license form with requested information. By way of example only, query table 130 includes one or more rows for each database query, and a series of columns 132, 134, 136, 138, 140, 142, 144, 146, and 148. Column 132 includes information pertaining to the name of a database query, while column 134 includes information indicating the name of the database table containing information for the query. Column 136 provides the actual database query for retrieving information from information database 18, and is preferably in the form of a SQL statement. Columns 138, 140, 142 respectively indicate the input parameters, a description of the input parameters, and corresponding default values for the input parameters, while column 144 provides the output parameters for the database query. Column 146 indicates a formula or manner in which to combine the query results to produce a desired format. Column 148 provides a description of the query results.

Figure 6:
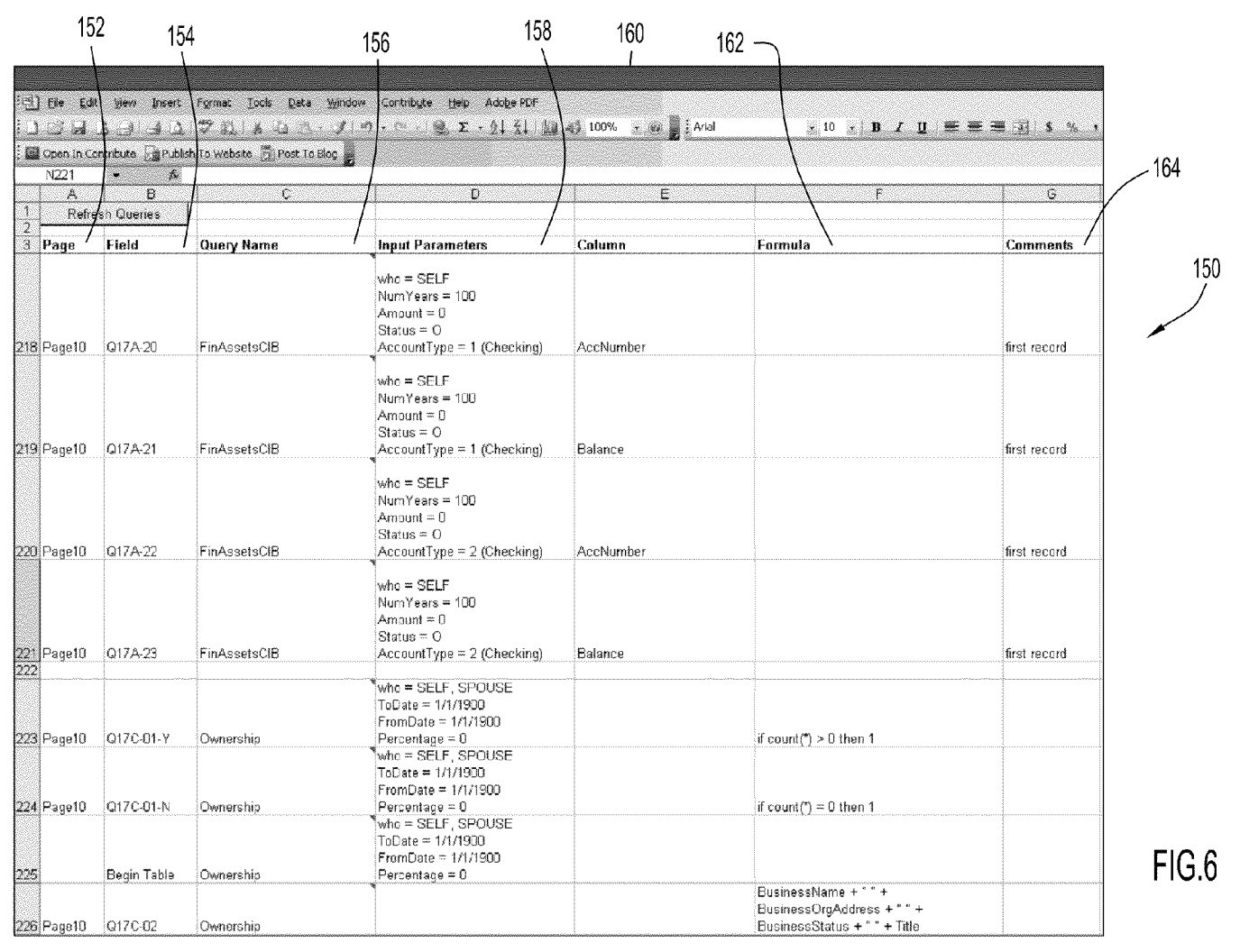

Initially, a map table is defined for each license form to map each form field to a database query within query table 130 in order to retrieve appropriate information for that field from information database 18. An example map table utilized in the mapping layer to map the fields of a license form to the database queries defined in query table 130 to retrieve appropriate information for the fields from information database 18 is illustrated in FIG. 6. By way of example only, a map table 150 includes a row for each field of a corresponding license form, and a series of columns 152, 154, 156, 158, 160, 162, and 164. Column 152 includes information pertaining to the page within the license form where the field resides, while column 154 includes information indicating the name of the field. Column 156 provides the name for the database query within query table 130 (FIG. 5) to be utilized for retrieving information from information database 18. Column 158 indicates the input parameters and corresponding values for the database query, while column 160 indicates the column (e.g., of the database table providing information for the query) from which to retrieve information. Column 162 indicates a formula or condition for the database query, and column 164 provides comments or a description for the database query.

Once the standardized license forms are stored and the database queries and mappings are defined, the license management system (e.g., via the license management and other modules) may enable users to create license forms (e.g., license applications, license renewals, etc.) via a user interface presented by client system 12 (FIG. 1A), where the fields of the license forms are populated with the appropriate data from information database 18. Basically, a license form is selected by a user via client system 12, and the license management system (e.g., via license management module 24) utilizes map table 150 associated with the selected license form to ascertain the appropriate database query and query parameters for each field of the selected license form in order to populate those fields with appropriate information from information database 18. Map table 150 references database queries within query table 130, where the license management module retrieves the database query (e.g., SQL) statements for those queries from query table 130 in order to execute the queries against information database 18. Once the database queries are executed and results are obtained, the data from the query results are provided to the license form fields. The various components of the mapping layer may be implemented by any suitable storage structures (e.g., tables, arrays, queues, lists, files, etc.), and may be generated manually or automatically by a computer system (e.g., licensing management system 16 or other computer system, etc.).

Figure 7:
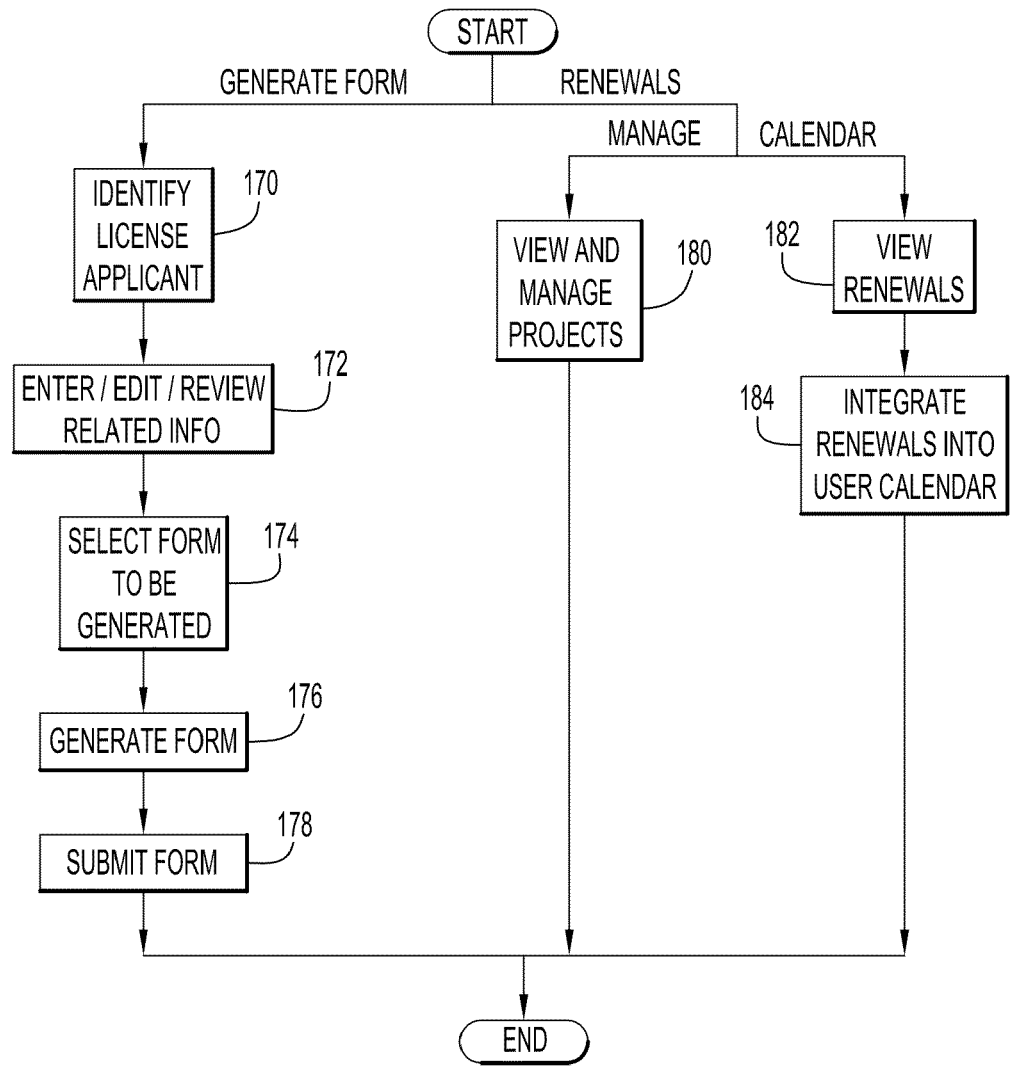
FIG. 7 is a flow diagram illustrating the manner in which license management is performed according to an embodiment of the present invention.

The manner in which the license management system (e.g., via the license management and/or other modules) provides license management is illustrated in FIG. 7. Initially, information about various license applicants are entered into the license management system and stored in information database 18 (FIG. 1A). This may be accomplished via a user interface (e.g., user interface 210 of FIG. 8) generated by the license management system and presented on client system 12. Further, license management system 16 collects, maintains, and/or updates the license forms and associated information (e.g., mappings, renewal dates, license duration, license expiration or expiration dates, etc.) within information database 18, forms mapping store 20, and/or forms library 22 as described above.

With respect to license form generation, a user utilizes client system 12 to interface with license management system 16. The client system presents a user interface 210 (FIG. 8) generated by license management system 16. User interface 210 is preferably in the form of a graphical user interface screen, and enables a user to identify a license applicant at step 170. By way of example, user interface 210 displays information in the form of a table including a row for each license applicant, and columns including various applicant information (e.g., first, middle, and last names, social security number, date of birth, an actuator (e.g., "Delete" as viewed in FIG. 8) to remove a license applicant from the table, etc.). Further, user interface 210 includes actuators to scroll through the table (e.g., arrow buttons as viewed in FIG. 8), and add additional license applicants to the table (e.g., "Add Employee" button as viewed in FIG. 8, where the identifier or key value (e.g., FIG. 4) is generated for new license applicants to uniquely identify those license applicants). License management system 16 generates and interacts with the user through user interface 210, and retrieves the information from information database 18 to populate the displayed table with the appropriate information. The license management system may further store information entered by the user in, or remove information from, appropriate tables of information database 18 (e.g., based on the generated identifier or key value for a license applicant in the case of adding or removing the license applicant). The user may select a particular license applicant, actuate an actuator and/or enter information via any suitable input device of the client system (e.g., mouse, keyboard, etc.).

Figures 9A, 9B:
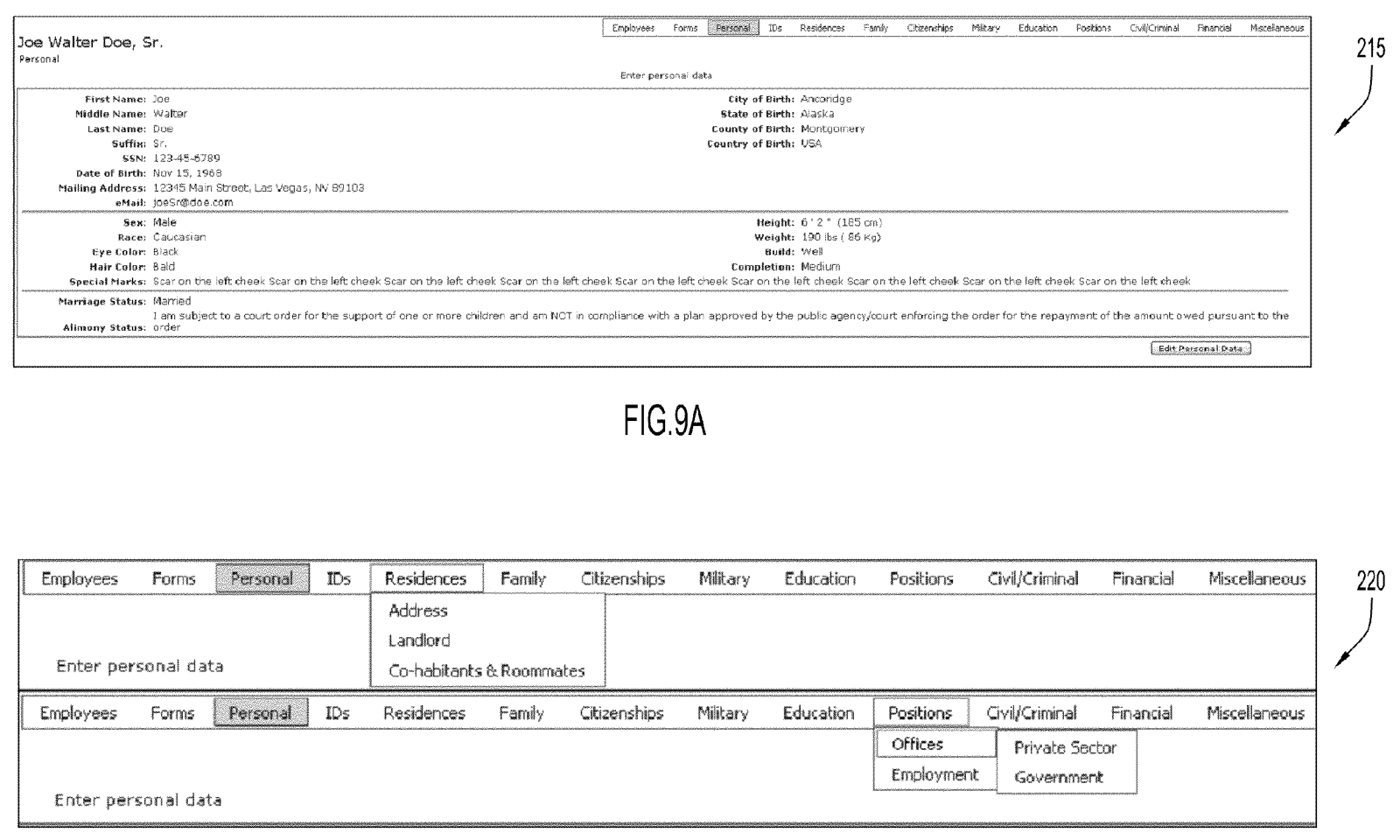

Once a license applicant is selected, information pertaining to the selected license applicant is retrieved by the license management system to enable the user to review, edit, and/or add information for the license applicant at step 172. By way of example only, the retrieved information may be displayed on user interfaces 215, 220, 225, 230 (FIGS. 9A-9D), preferably in the form of graphical user interface screens, that are generated by license management system 16 and presented by client system 12. User interface 215 (FIG. 9A) provides various personal information associated with a selected license applicant (e.g., first, middle, and last names, suffix, social security number, date of birth, mailing address, electronic mail address, City, State, County and Country of birth, gender, race, eye color, hair color, special marks, height, weight, build, complexion, marital status, alimony status, etc.). Further, user interface 215 includes an actuator to edit the displayed information (e.g., "Edit Personal Data" button as viewed in FIG. 9A). License management system 16 generates and interacts with the user through user interfaces 215, and retrieves the applicant information from information database 18 for display. The license management system may further store information entered by the user in appropriate tables of information database 18 (e.g., based on the generated identifier or key value for the license applicant in the case of editing the personal information). The user may actuate an actuator and/or enter information via any suitable input device of the client system (e.g., mouse, keyboard, etc.).

Different types of information about each license applicant are stored in information database 18, preferably in a standardized format. The license forms are reviewed, and the data model and user interface are designed to account for a broad set of requirements and permutations as described above. For example, user interfaces 220, 225 (FIGS. 9B-9C) provide a grouping of data for gaming license applications, and includes categories of: Personal Information, Residences (FIG. 9B) (e.g., Addresses, Landlord, and Co-habitants and Roommates, etc.); Positions (FIG. 9B) (e.g., Private Sector and Governmental Offices and Employment History, etc.); and Civil and Criminal Proceedings (FIG. 9C) (e.g., Offenses, Arrests, Charges, Courts, Dispositions, Civil Lawsuits, Investigations, Other Code Violations and Bankruptcies, etc.). Further, user interfaces 220, 225 each include an actuator to enter or edit the information (e.g., "Enter Personal Data" as viewed in FIGS. 9B-9C).

Within each category, more specific data requested by license forms may be maintained. For example, user interface 230 (FIG. 9D) may provide, with respect to Residential Data, general residence information (e.g., address, telephone number, etc.) and more specific information including dates of residence, addresses, and the ownership status of the property (e.g., owned or rented). Further, user interface 230 includes actuators to edit or remove residence information entries (e.g., "Edit'Delete" actuators as viewed in FIG. 9D). License management system 16 generates and interacts with the user through user interfaces 215, 220, 225, and 230, and retrieves the information from information database 18 to populate the displayed user interface screens with the appropriate information. The license management system may further store information entered by the user in appropriate tables of information database 18 (e.g., based on the generated identifier or key value of the applicant in the case of entering and/or editing the personal information). The user may select a particular license applicant, actuate an actuator and/or enter information via any suitable input device of the client system (e.g., mouse, keyboard, etc.).

License forms of various sources or formats are stored within the license management system (e.g., in forms library 22) as described above. These stored license forms are converted to a standard or common format, where the form fields are drawn and mapped to a central database (e.g., information database 18) as described above. The license management system (e.g., via license management module 24) retrieves information pertaining to the various stored license application forms from forms library 22 for display to the user via user interface 235 (FIG. 10) to enable selection of a desired form at step 174. User interface 235 is preferably in the form of a graphical user interface screen, and is generated by license management system 16 for presentation by client system 12. By way of example, user interface 235 displays information in the form of a table including a row for each license form, and columns including various form information (e.g., jurisdiction, type of jurisdiction, type of form, an actuator (e.g., "Generate" as viewed in FIG. 10 to generate the particular form as described below), etc.). Further, user interface 235 includes actuators to scroll through the table (e.g., arrow buttons as viewed in FIG. 10). License management system 16 generates and interacts with the user through user interface 235, and retrieves the information from forms library 22 to populate the displayed table with the appropriate information. The user may select a particular license application form, actuate an actuator and/or enter information via any suitable input device of the client system (e.g., mouse, keyboard, etc.).

Once the user selects a desired form by actuating the corresponding actuator (e.g., "Generate" button) on user interface 235 via client system 12, the license management system generates the selected license form with appropriate information at step 176. The license management system may automatically generate different license forms based on the population of form fields with information from a common set of data stored within the license management system (e.g., information database 18), the standardized formatting of the license forms, and the mapping between license form fields and the common information within information database 18 (e.g., the mapping to database queries, etc.). The central database (e.g., information database 18) includes a structure that accounts for similar licensing requirements in different jurisdictions, and a layer of detailed mappings (e.g., forms mapping store 20) that relate the structure of the database (e.g., information database 18) to the structure of the license forms. In particular, the license management system (e.g., via license management module 24) determines the desired license form based on the selection by the user. The selected license form is typically associated with an identifier to enable the license management system to access corresponding components of the mapping layer and retrieve the appropriate information from information database 18. For example, the identifier may be a form name, where files containing the map tables may include the form name as part of the filename. Alternatively, the identifier may be implemented by any suitable indicator identifying the particular mapping layer components (e.g., key, address, filename or location, directory, etc.).

The license management system populates fields of the selected license form with appropriate data from information database 18. In particular, for each field within the selected license form, the license management system retrieves database query information for that field from a map table 150 (FIG. 6) associated with that form, where the query information includes a query name (e.g., column 156 of map table 150) and corresponding parameters (e.g., columns 158, 160, and 162 of map table 150) for a corresponding database query within query table 130 (FIG. 5). Since each row of the map table corresponds to a particular field, the license management system may process each row of the table (in any desired order) to ascertain the desired query information for each field.

The license management system accesses query table 130 (FIG. 5), and identifies the database query therein (e.g., columns 132 of query table 130) with the query name retrieved from map table 150. The license management system retrieves query (e.g., SQL) statements (e.g., column 136 of query table 130) and parameters (e.g., columns 138, 140, 142, 144, and 146 of query table 130) of the identified database query from query table 130, and executes the retrieved database query against information database 18 to retrieve information for the corresponding field. The license management system provides data from the query results to the license form field.

Once the license form fields have been populated with appropriate information, the license form is generated by the license management system, and may be displayed to the user on client system 12. Example gaming license forms 240, 245 generated by the license management system for the Nevada and New Jersey gaming authorities are illustrated in FIGS. 11A-11B. In addition, the generated form may be electronically submitted to the regulatory authority at step 178 (e.g., electronic mail, web services, etc.). Alternatively, the generated form may be printed and submitted to the regulatory authority in paper or hardcopy form (e.g., facsimile, ground delivery, etc.). The generated form may further be stored in the license management system (e.g., forms library 22).

Figure 12B:
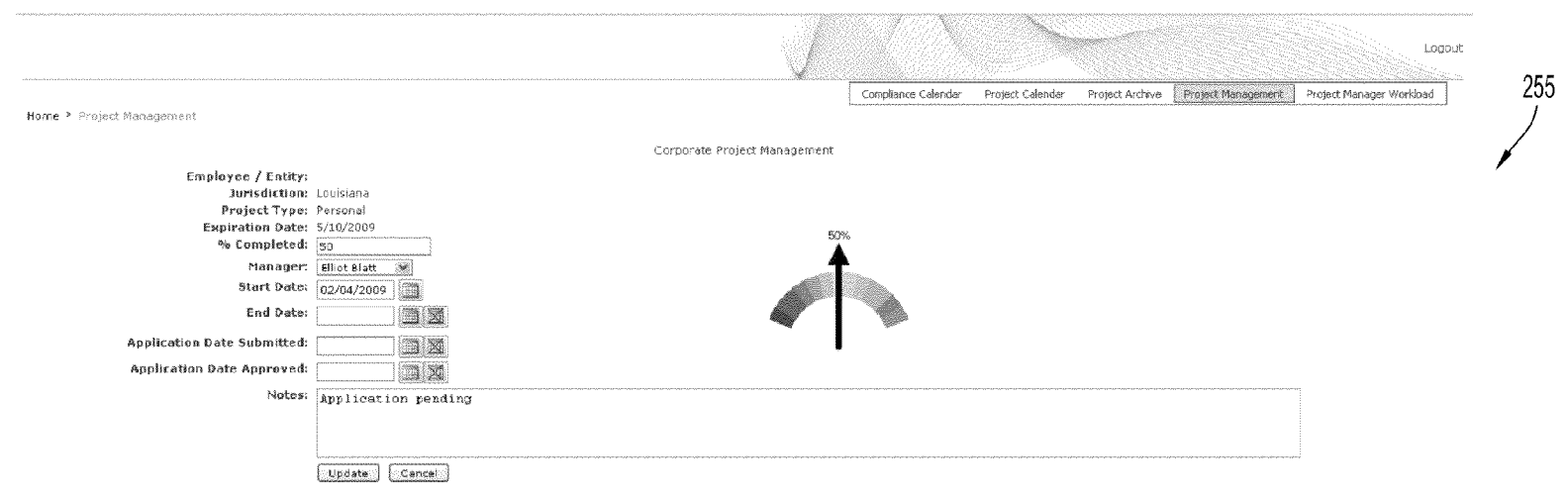

With respect to project management, the license management system (e.g., via project module 90) may further enable users to manage projects at step 180. Initially, the projects typically relate to application for and/or renewal of licenses (e.g., submission of appropriate license forms to the corresponding authority, etc.). The license management system identifies projects set to expire within a certain time interval, and displays the identified projects on a user interface 250 (FIG. 12A). User interface 250 is preferably in the form of a graphical user interface screen, and is generated by license management system 16 for presentation by client system 12. The project information is preferably stored in information database 18 or other storage unit (e.g., forms library 22), and may be entered by a user via user interface screens (e.g., user interface 255 of FIG. 12B) and/or provided by the license management system. By way of example, the projects relate to renewal of licenses, and user interface 250 displays information in the form of a table including a row for each project, and columns including various information (e.g., employee/entity, jurisdiction, Agency/Authority, expiration date of the license, project end date, manager assigned to each project, status, etc.). The status information includes a color-coded status bar (e.g., red, yellow, green, etc.) that indicates the progress of the project (e.g., red to indicate that the project has not yet been started, yellow to indicate that the project is in progress, green to indicate that the project is completed, etc.), where the color-coding scheme is based upon preconfigured criteria. License management system 16 generates and interacts with the user through user interface 250, and retrieves the information from information database 18 to populate the displayed table with the appropriate information. The user may select a particular project and/or enter information via any suitable input device of the client system (e.g., mouse, keyboard, etc.).

The user may select a particular project and update the information via user interface 255 (FIG. 12B). User interface 255 is preferably in the form of a graphical user interface screen, and is generated by license management system 16 for presentation by client system 12. By way of example, user interface 255 displays information for a selected project, and provides various information (e.g., employee/entity, jurisdiction, project type, expiration date, percent completed, manager, start date, end date, application date submitted, application date approved, notes, etc.). The information (e.g., percent completed, manager, start and end dates, application submitted and approved, notes, etc.) may be selectively edited and/or entered by the user. The interface further includes status information in the form of a color-coded, generally semi-circular bar with an indicator or arrow. The color-coded scheme transitions through colors (e.g., from red (indicating that the project has not yet started) to yellow (indicating that the project is in progress) to green (indicating that the project is completed)), where the indicator indicates the progress of the project (e.g., and the percent completed may be displayed as viewed in FIG. 12B) based upon preconfigured criteria. License management system 16 generates, and interacts with the user through, user interface 255, and retrieves the information from information database 18 to provide the appropriate information. Further, the license management system may store information entered by a user in information database 18 and/or forms library 22 in the case of the user editing the project information. The user may enter information via any suitable input device of the client system (e.g., mouse, keyboard, etc.).

In addition, the license management system (e.g., via calendar module 95) may provide a compliance calendar that tracks renewal dates of licenses, and provides information to users. The compliance calendar typically alerts users in advance of requirements to renew licenses, and is integrated with commercially available or other electronic mail and calendar packages (e.g., Microsoft Outlook, Lotus Notes, etc.). However, the license renewal form is generated by the license management system in substantially the same manner described above. The compliance calendar enables the user to link to the project management functions described above (e.g., step 180 and FIGS. 12A and 12B) that allows users to track the license application and/or renewal process.

In particular, the license management system retrieves information pertaining to licenses set to expire within a predetermined time interval (e.g., forty days, etc.). This time interval may be configurable, and set to any desired interval (e.g., on the order of days, weeks, months, years, etc.). The retrieved information may be displayed on a user interface 260 (FIG. 13A) at step 182. User interface 260 is preferably in the form of a graphical user interface screen, and is generated by license management system 16 for presentation by client system 12. By way of example, user interface 260 displays information in the form of a table including a row for each license, and columns including various form information (e.g., jurisdiction, Agency/Authority, license number, etc.). Further, user interface 260 includes actuators to scroll through the table (e.g., arrow buttons as viewed in FIG. 13A), and to send a reminder of one or more upcoming license expiration dates (e.g., "Send Reminder" button as viewed in FIG. 13A). License management system 16 generates and interacts with the user through user interface 260, and retrieves the information from information database 18 and/or forms library 22 to populate the displayed table with the appropriate information. The user may actuate an actuator and/or enter information via any suitable input device of the client system (e.g., mouse, keyboard, etc.).

Figure 13B:
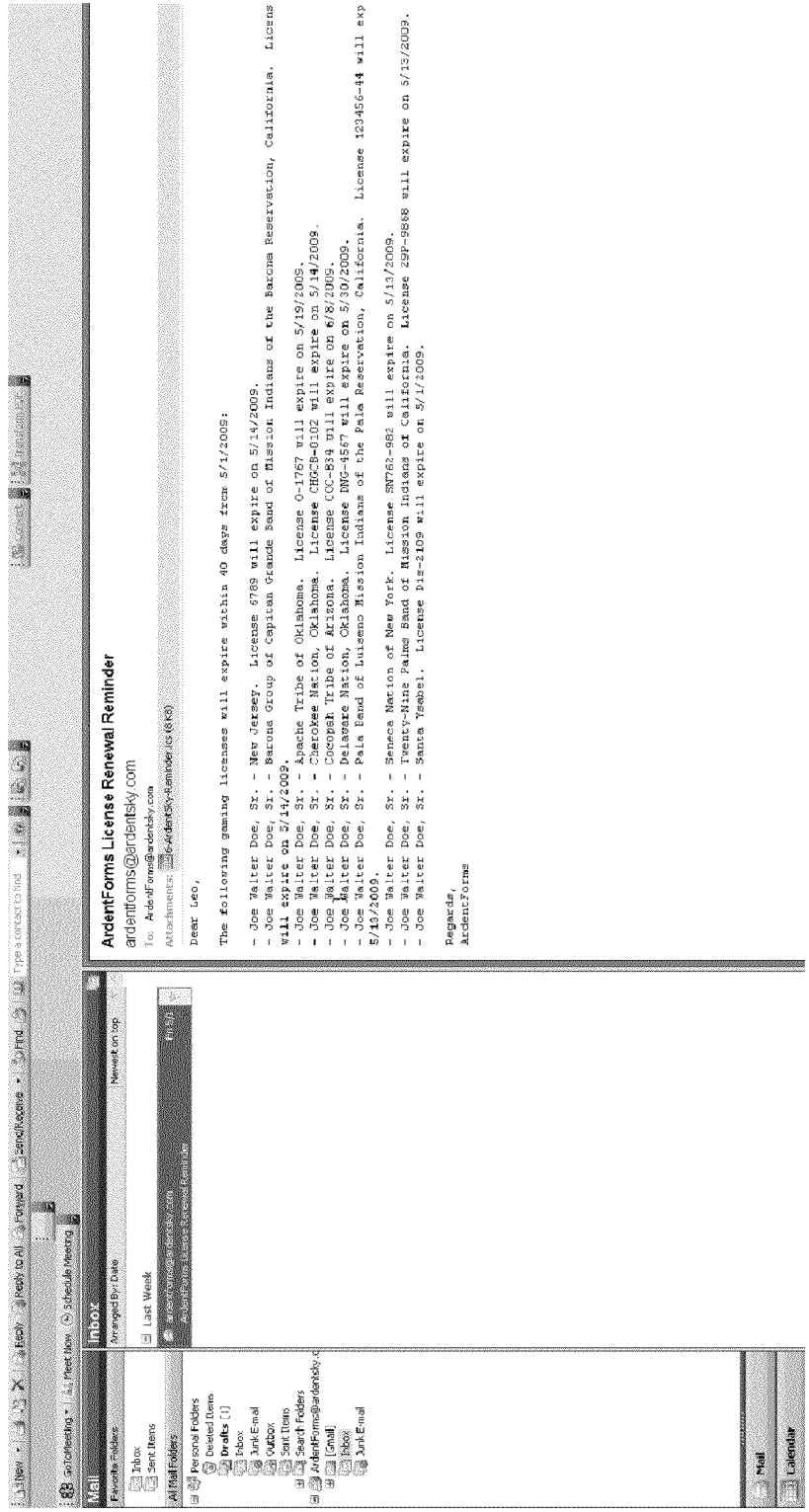
FIG. 13B is an illustration of an example graphical user interface screen showing an electronic mail notification providing license renewal date information according to an embodiment of the present invention.
Figure 13C:
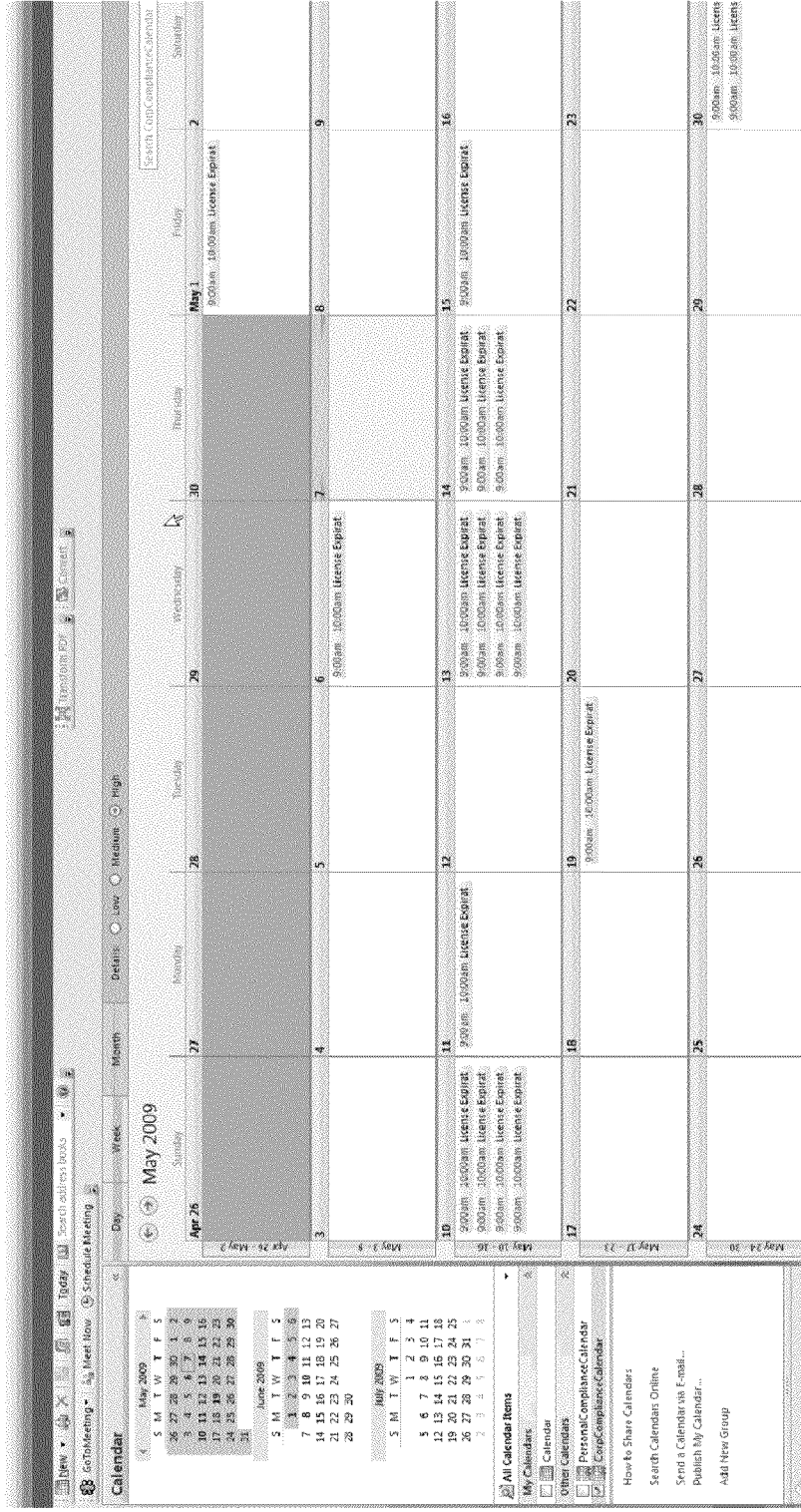
FIG. 13C is an illustration of an example graphical user interface screen showing a calendar with license renewal information thereon according to an embodiment of the present invention.

Once the user actuates the reminder actuator, the license management system sends a reminder of one or more upcoming license expiration dates. The reminder may be in the form of an electronic mail message, an example of which is illustrated in FIG. 13B. The message provides information (e.g., applicant/entity, license, expiration date, etc.) about each of the licenses set to expire within the predetermined time interval, and is transmitted to a predefined address enabling the list of expiring licenses to be integrated with a conventional or other calendar at step 184, preferably an electronic mail calendar. For example, the license management system may generate a file in an Internet Calendaring and Scheduling (ICS) format that is electronically mailed to the user (e.g., an attachment as viewed in the electronic mail message of FIG. 13B). The file includes information about corporate and personal license expiration dates, license maintenance dates, reporting dates, and other compliance-related events. The file information is integrated with the calendar to notify the user of upcoming dates. An example electronic mail calendar 270 is illustrated in FIG. 13C. By way of example, a month of the calendar is displayed with license expirations integrated therein and shown on corresponding days of the month.

Alternatively, an electronic mail or other calendar (e.g., Outlook, etc.) may be automatically synchronized with the license management system with respect to license expiration or renewal dates (without the user sending a notification or receiving an electronic mail message) at step 184. For example, the compliance calendar may be integrated with the Internet calendar capability available in various commercial electronic mail and calendar packages (e.g., Outlook 2007, etc.). The Internet calendar is configured with a Uniform Resource Locator (URL) pointing to a software program or application (e.g., calendar module 95) that periodically synchronizes calendars by generating a data stream in the Internet Calendaring and Scheduling (ICS) format described above. The generated ICS stream contains license management information from the license management system to be integrated with the calendar (FIG. 13C). In addition, a plurality of Internet calendars may be configured for various classes of users. By way of example, a personal Internet calendar may only display compliance events applicable to a particular person, while a corporate compliance calendar may display events for employees and business units. The former calendar is used by an employee, while the latter calendar is used by a compliance department. The URLs may be securely generated to ensure information confidentiality.

The various user interface screens generated by license management system 16 may include navigation screens and/or links to enable users to navigate to appropriate interface screens providing desired functions (e.g., form generation, project management, compliance calendar, etc.).

In some instances, a license form may include an insufficient area for a field to accommodate the corresponding information (e.g., retrieved from information database 18). For example, an applicant may have more licenses or residences than a license form can accommodate. Since the license forms provided by an official regulatory authority cannot be expanded or otherwise modified, an attachment to the license form or an overflow area needs to be created in order to accommodate the additional information. Some license forms prescribe the format of the attachment, but the majority of license forms leave the format to applicant's discretion, subject to the approval by relevant regulatory authorities. If the format of the overflow area is pre-defined, the license management system (e.g., via the license management and other modules) may generate and populate the attachments with the license form in substantially the same manner described above (e.g., a static approach).

Figure 14A:
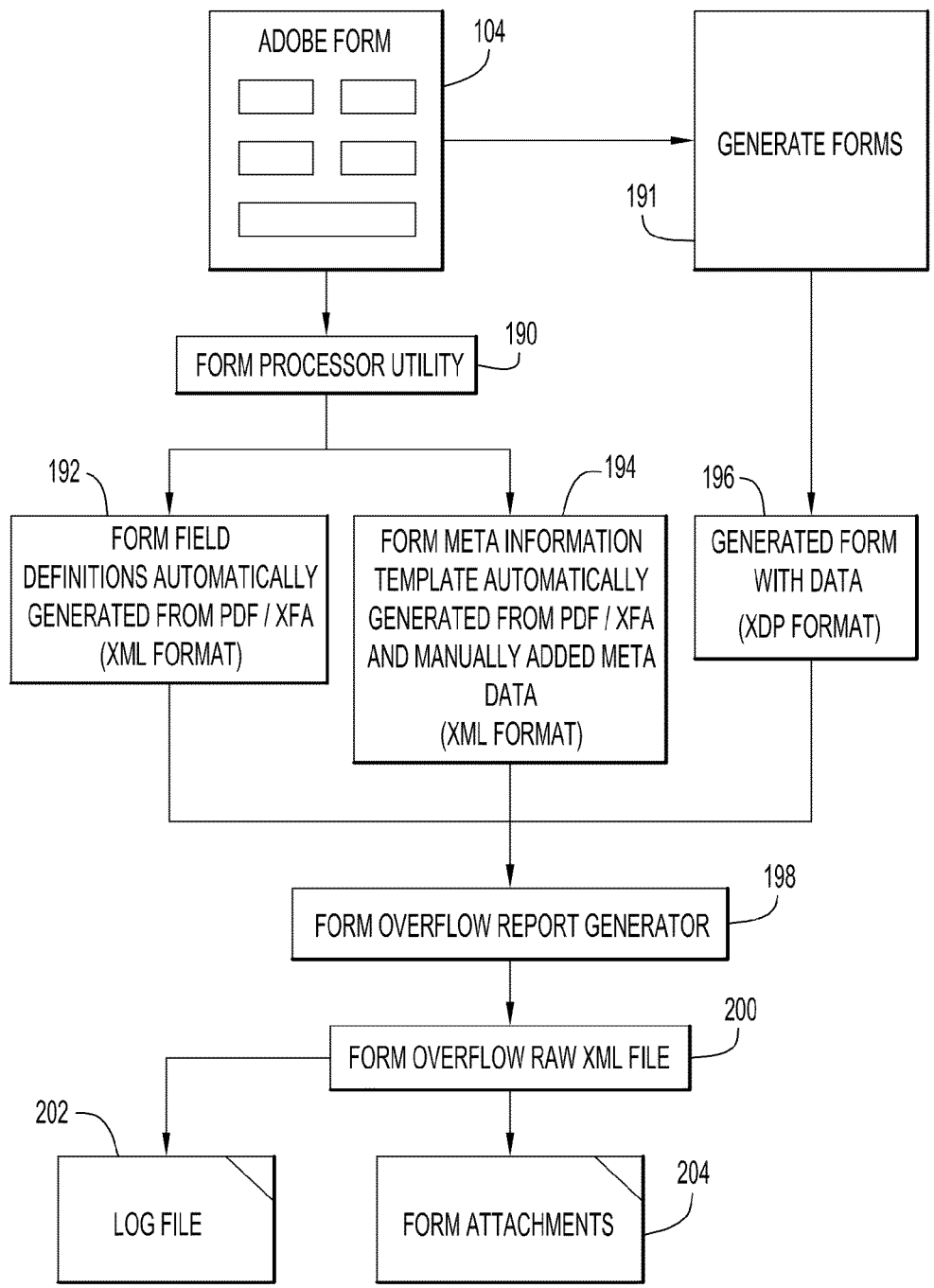
FIG. 14A is a flow diagram illustrating the manner in which overflow information for a license form is accommodated according to an embodiment of the present invention.

However, when the format of the overflow area is not prescribed, the license management system may automatically handle these overflow situations (e.g., a dynamic approach). The manner in which the license management system (e.g., via the license management and/or other modules) accommodates information for overflow areas (e.g., information that should be included on a license form but does not fit within the corresponding form field) and provides a form attachment is illustrated in FIG. 14A. In particular, a license form 104 (e.g., in ADOBE XFA or other formats) is processed by a form processor module 190. The form processor module is coupled to or included within license management module 24, and may be implemented by one or more software and/or hardware modules. The form processor module extracts field definitions from license form 104 and generates a field definition file (e.g., XML, etc.) at 192. The field definition file includes various information about a field (e.g., field length, data type, etc.). The form processor module further generates a form definition template (e.g., in XML or other formats) at 194. The template defines the structure of the form for data population and/or form generation. The template is updated during form preparation (e.g., review of license form fields, generation of the mapping layer, etc.) to incorporate meta-information (e.g., table headers, paragraph headers, paragraph numbers, page numbers to be used in the attachment to link information to the corresponding sections of the form, etc.).

License management system 16 populates license form 104 from information database 18 in substantially the same manner described above (e.g., mapping the license form fields to database queries to retrieve information, etc.) at 191, and generates the complete form content file (e.g., in ADOBE XDP or other formats) including data requested by the license form at 196.

A form overflow report generator module 198 compares the form definition template to the populated form (e.g., in the XDP or other format) and to the form field definition file to identify overflow information or data that does not fit within a corresponding form field. The identified overflow information is stored in a file at 200 (e.g., an XML or other type of file). The form overflow report generator module is coupled to or included within license management module 24, and may be implemented by one or more software and/or hardware modules. The identified overflow information is formatted using the form definition template, and an attachment 204 is generated with the license form. An example of an attachment is illustrated in FIG. 14B. By way of example, the attachment includes information indicating the page and question numbers of the license form to which the overflow information pertains, and the overflow information relating to the particular question (e.g., license application information including the application date, disposition, agency and status as viewed in FIG. 14B).

In addition, the form overflow report generator module may generate a log file 202 to document the cases where information or data exceeded a corresponding form field for analysis and determining appropriate courses of action. The log file may include any desired information to document the occurrence of an overflow condition (e.g., form name or identifier, page number, question number, field name, data for the field, overflow data for the field, time of occurrence of the overflow, etc.).

It will be appreciated that the embodiments described above and illustrated in the drawings represent only a few of the many ways of implementing a system and method for managing licenses.

The environment of the present invention embodiments may include any quantity of end-user systems, computer or server systems, databases or stores, and libraries. The end-user and other computer systems employed by the present invention embodiments (e.g., client computer system, license management system, vendor computer system, authority computer system, etc.) may be implemented by any quantity of any personal or other type of computer system (e.g., IBMcompatible, Apple, Macintosh, laptop, palm pilot, etc.), and may include any commercially available operating system (e.g., Windows, OS/2, Unix, Linux, etc.) and any commercially available or custom software (e.g., browser software, communications software, server software, license management and other modules, etc.). These systems may include any types of monitors and input devices (e.g., keyboard, mouse, voice recognition, etc.) to enter and/or view information.

It is to be understood that the software (e.g., license management and other modules, etc.) for the computer systems of the present invention embodiments may be implemented in any desired computer language, and could be developed by one of ordinary skill in the computer arts based on the functional descriptions contained in the specification and flow diagrams illustrated in the drawings. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among any quantity of end-user, vendor, authority, and license management systems. The software and/or algorithms described above and illustrated in the flow diagrams may be modified in any manner that accomplishes the functions described herein. In addition, the functions in the flow diagrams or description may be performed in any order that accomplishes a desired operation.

The software of the present invention embodiments may be available on a program product apparatus or device including a recordable or computer usable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The communication networks may be implemented by any quantity of any type of communications networks (e.g., LAN, WAN, Internet, Intranet, VPN, etc.). The computer systems of the present invention embodiments may include any conventional or other communications devices to communicate over the networks via any conventional or other protocols. The computer systems may utilize any type of connection (e.g., wired, wireless, etc.) for access to the networks. For example, the license management system may be in the form of a server system, and may be accessed by remote users over various networks (e.g., Internet, WAN, LAN, etc.).

The forms may be of any type, and include any quantity of any types of fields (e.g., text, check box, numeric, etc.). The fields may be of any suitable size, where the forms may request any user information.

The databases, libraries, and stores may be implemented by any quantity of any conventional or other databases, stores or storage structures (e.g., files, databases, data structures, directories, etc.). The databases, libraries, and stores may be remote from or local to each other, the end-user system and/or the license management system. The databases, libraries, and stores may store any desired information, and be arranged in any fashion (e.g., in accordance with any suitable data model or schema). The various information (e.g., personal information, mappings, forms, etc.) may be stored in any fashion within and among the information database, forms mapping store, and forms library. The information database may include any suitable data model, and preferably stores only one instance of data for the forms (e.g., the same information requested by plural forms is stored once in the data model). However, the information database may store the requested information any quantity of times. The information database may include any quantity of tables with any suitable configuration (e.g., any quantity of rows and columns, etc.) to store any desired information. The tables may include any quantity of keys of any suitable values.

The forms mapping store may store any desired information, and may be arranged in any fashion. The mapping layer may include any quantity of tables containing any desired information. The database queries may be defined in one or more tables or other storage units (e.g., databases, data structures, etc.), and may be accessed by or linked to form fields in any desired fashion (e.g., form or field names, addresses, pointers, etc.). The various field, file and other names may include any suitable names or labels. The database queries may be implemented in any suitable query language (e.g., SQL, etc.), and may include any desired parameters, clauses and/or conditions.

The license management system may manage any types of form related or other projects (e.g., generation, submission, renewal, appointments, etc.). The license management system may utilize any configurable time interval to identify upcoming projects (e.g., days, months, years, hours, minutes, seconds, etc.), and may store and provide any desired information pertaining to the project (e.g., dates, personnel, tasks, status, etc.).

The license management system may notify users of upcoming events in any desired fashion (e.g., electronic mail, facsimile, cellular telephone voice or electronic messages, etc.). The license management system may synchronize with a user calendar at any suitable time intervals to provide event information (e.g., minutes, seconds, hours, days, etc.). The event information may be provided in any desired format for any conventional or other calendar package. The license management system may track any desired form related or other events (e.g., due dates, appointments, submissions, renewals, etc.).

The license management system may generate any types of attachments in any desired arrangement to provide additional information beyond the capacity of a form field. The license management system may produce any suitable files or information to determine the presence of an overflow condition. The files may be of any suitable conventional or other type. The log file may include any desired information concerning the overflow condition and be arranged in any fashion. The attachment and log file may be generated in any desired conventional or other format.

The user interface screens may be arranged in any fashion, and may provide any type of information. The screens may include any quantity of any types of input mechanisms (e.g., fields, radio or other buttons, icons, etc.) with any suitable labels. The project status may be displayed on the screens in any manner (e.g., charts, bars, numbers, etc.), and employ any type of scheme (e.g., color coding, change in boldness or size, etc.). Any desired criteria, parameters, and/or information may be utilized to determine the project status. The user interface screens may include any desired navigational items to enable a user to navigate to desired screens and/or functions.

The forms may be collected in any suitable fashion, either manually or automatically (e.g., via any suitable processing system or device), and may be of any type or format. The license management system may convert collected documents to any suitable format, and may employ any quantity of formats for the collected documents. For example, the license management system may selectively convert and accommodate documents in two or more formats. Similarly, the license management system may generate forms in any suitable format, and may enable a user to select the format for the generated form.

The present invention embodiments are not limited to the forms, industries, and authorities described above, but may be utilized with any types of forms or documents for submission to any organization or entity (e.g., license applications forms, license renewal forms, license or other form attachments, health care forms, federal or state government agency forms, various types of applications, insurance forms, etc.). In addition, the present invention embodiments may store any desired information concerning the forms, documents and/or users.

It is to be understood that the terms "top", "bottom", "front", "rear", "side", "height", "length", "width", "upper", "lower", "vertical" and the like are used herein merely to describe points of reference and do not limit the present invention to any particular orientation or configuration.

From the foregoing description, it will be appreciated that the invention makes available a novel system and method for managing licenses, wherein application for, and renewal of, licenses is managed.

Having described preferred embodiments of a new and improved system and method for managing licenses, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system to generate one or more forms to obtain a license from an authority, and to manage licenses comprising:
    one or more computer systems each including at least one processor to generate license forms and manage licenses, said one or more computer systems further including:
        a form storage unit to store a plurality of license forms, wherein each said license form includes a plurality of fields each to receive information requested by that field, and said plurality of license forms includes forms to obtain licenses from at least two different authorities;
        an information storage unit to store said information requested by said license form fields;
        a mapping layer to store information mapping each license form field to corresponding requested information in said information storage unit, wherein at least two fields of different license forms are mapped to the same requested information in said information storage unit, wherein said mapping layer includes:
            a query storage unit to store queries to retrieve requested information from said information storage unit; and
            a map storage unit to store mappings of each field of said license forms to a corresponding query within said query storage unit;
        a license module to retrieve a user selected license form from said form storage unit, wherein said selected license form is utilized to obtain a license from an authority;
        a map module to identify each field within said selected license form and map that field to corresponding requested information within said information storage unit based on a mapping within said mapping layer;
        a populate module to retrieve said mapped requested information for each field within said selected license form from said information storage unit by utilizing corresponding mappings from said map storage unit and corresponding queries from said query storage unit, and to place said retrieved requested information in corresponding fields of said selected license form to generate a completed form utilized to obtain said license from said authority, wherein said populate module retrieves a query for a corresponding license form field from said query storage unit based on a mapping for said corresponding license form field within said map storage unit, and executes said retrieved query against said information storage unit to retrieve said requested information for said corresponding license form field; and
        an overflow module to identify a field within said selected license form with insufficient capacity to accommodate said requested information from said information storage unit and to automatically generate an attachment for said selected license form including for said identified field said requested information exceeding said capacity of that field.

2. The system of claim 1, wherein a plurality of fields from different license forms request information in common and said information storage unit stores a single instance of said common information, and wherein said mapping layer maps each of said plurality of fields to said single instance of said common information within said information storage unit.

3. The system of claim 1, wherein said one or more computer systems further include:
    a project module to maintain and manage information pertaining to one or more projects for renewal of licenses.

4. The system of claim 1, wherein said one or more computer systems further include:
    a calendar module to identify licenses of a user with renewals due within a predetermined time interval and to inform that user of said identified licenses and corresponding renewal dates.

5. The system of claim 4, wherein said user utilizes a computerized calendar, and said calendar module informs said user by inserting said renewal dates within said user calendar by one of: sending an electronic mail message including calendar information to said user to update said user calendar with said renewal dates, and periodically synchronizing said user calendar with said renewal dates.

6. The system of claim 1, wherein said authority provides one of licenses for gaming and licenses for pharmaceuticals.

7. The system of claim 1, wherein said license forms are accessible on network sites of said at least two authorities, and said one or more computer systems further include:
    a forms collector module to access said network sites and retrieve at least one of new license forms and modified license forms.

8. A program product apparatus for generating one or more forms to obtain a license from an authority and to manage licenses, said program product apparatus comprising:

a computer readable memory device having computer readable program code embodied therewith, the computer readable program code comprising:

a license module to retrieve a user selected license form from a form storage unit, wherein said selected license form is utilized to obtain a license from an authority, and wherein said form storage unit stores a plurality of license forms with each said license form including a plurality of fields each to receive information requested by that field and said plurality of license forms including forms to obtain licenses from at least two different authorities;

a map module to identify each field within said selected license form and map that field to corresponding requested information within an information storage unit based on a mapping within a mapping layer, wherein said information storage unit stores said information requested by said license form fields, wherein said mapping layer stores information mapping each license form field to corresponding requested information in said information storage unit, and wherein at least two fields of different license forms are mapped to the same requested information in said information storage unit, and wherein said mapping layer includes:

a query storage unit to store queries to retrieve requested information from said information storage unit; and a map storage unit to store mappings of each field of said license forms to a corresponding query within said query storage unit;

a populate module to retrieve said mapped requested information for each field within said selected license form from said information storage unit and place said retrieved requested information in corresponding fields of said selected license form to generate a completed form utilized to obtain said license from said authority, wherein said populate module retrieves a query for a corresponding license form field from said query storage unit based on a mapping for said corresponding license form field within said map storage unit, and executes said retrieved query against said information storage unit to retrieve said requested information for said corresponding license form field; and an overflow module to identify a field within said selected license form with insufficient capacity to accommodate said requested information from said information storage unit and to automatically generate an attachment for said selected license form including for said identified field said requested information exceeding said capacity of that field.

9. The apparatus of claim 8, wherein a plurality of fields from different license forms request information in common and said information storage unit stores a single instance of said common information, and wherein said mapping layer maps each of said plurality of fields to said single instance of said common information within said information storage unit.

10. The apparatus of claim 8, wherein said computer readable program code further includes:

a project module to maintain and manage information pertaining to one or more projects for renewal of licenses.

11. The apparatus of claim 8, wherein said computer readable program code further includes:

a calendar module to identify licenses of a user with renewals due within a predetermined time interval and to inform that user of said identified licenses and corresponding renewal dates.

12. The apparatus of claim 11, wherein said user utilizes a computerized calendar, and said calendar module informs said user by inserting said renewal dates within said user calendar by one of: sending an electronic mail message including calendar information to said user to update said user calendar with said renewal dates, and periodically synchronizing said user calendar with said renewal dates.

13. The apparatus of claim 8, wherein said authority provides one of licenses for gaming and licenses for pharmaceuticals.

14. The apparatus of claim 8, wherein said license forms are accessible on network sites of said at least two authorities, and said computer readable program code further includes:

a forms collector module to access said network sites and retrieve at least one of new license forms and modified license forms.

15. A computer-implemented method of generating one or more forms to obtain a license from an authority and managing licenses comprising:

(a) retrieving a user selected license form from a form storage unit via a processor, wherein said selected license form is utilized to obtain a license from an authority, and wherein said form storage unit stores a plurality of license forms with each said license form including a plurality of fields each to receive information requested by that field and said plurality of license forms including forms to obtain licenses from at least two different authorities;

(b) identifying each field within said selected license form via said processor and mapping that field to corresponding requested information within an information storage unit based on a mapping within a mapping layer, wherein said information storage unit stores said information requested by said license form fields, wherein said mapping layer stores information mapping each license form field to corresponding requested information in said information storage unit, and wherein at least two fields of different license forms are mapped to the same requested information in said information storage unit, and wherein said mapping layer includes:

a query storage unit to store queries to retrieve requested information from said information storage unit; and a map storage unit to store mappings of each field of said license forms to a corresponding query within said query storage unit;

(c) retrieving via said processor said mapped requested information for each field within said selected license form from said information storage unit and placing said retrieved requested information in corresponding fields of said selected license form to generate a completed form utilized to obtain said license from said authority, wherein step (c) further includes:

(c.1) retrieving a query for a corresponding license form field from said query storage unit based on a mapping for said corresponding license form field within said map storage unit, and executing said retrieved query against said information storage unit to retrieve said requested information for said corresponding license form field; and (d) identifying via said processor a field within said selected license form with insufficient capacity to accommodate said requested information from said information storage unit and automatically generating an attachment for said selected license form including for said identified field said requested information exceeding said capacity of that field.

16. The method of claim 15, wherein a plurality of fields from different license forms request information in common and said information storage unit stores a single instance of said common information, and wherein said mapping layer maps each of said plurality of fields to said single instance of said common information within said information storage unit.

17. The method of claim 15, further including:
(e) maintaining and managing information pertaining to one or more projects for renewal of licenses.

18. The method of claim 15, further including:
(e) identifying licenses of a user with renewals due within a predetermined time interval and informing that user of said identified licenses and corresponding renewal dates.

19. The method of claim 18, wherein said user utilizes a computerized calendar, and step (e) further includes:
(e.1) informing said user by inserting said renewal dates within said user calendar by one of: sending an electronic mail message including calendar information to said user to update said user calendar with said renewal dates, and periodically synchronizing said user calendar with said renewal dates.

20. The method of claim 15, wherein said authority provides one of licenses for gaming and licenses for pharmaceuticals.

21. The method of claim 15, wherein said license forms are accessible on network sites of said at least two authorities, and step (a) further includes:
(a.1) accessing said network sites and retrieving at least one of new license forms and modified license forms.

22. The system of claim 1, wherein said license forms include at least one of license application forms, license renewal forms, and license form attachments.

23. The apparatus of claim 8, wherein said license forms include at least one of license application forms, license renewal forms, and license form attachments.

24. The method of claim 15, wherein said license forms include at least one of license application forms, license renewal forms, and license form attachments.

25. The system of claim 7, wherein said collector module accesses said network sites at predetermined times.

26. The system of claim 7, wherein said forms collector module identifies a modified license form to retrieve based on said modified license form having a checksum other than a checksum of a version of a corresponding form previously obtained by said system.

27. The program product apparatus of claim 14, wherein said forms collector module accesses said network sites at predetermined times.

28. The program product apparatus of claim 14, wherein said forms collector module identifies a modified license form to retrieve based on said modified license form having a checksum other than a checksum of a version of a corresponding form previously obtained.

29. The method of claim 21, wherein said step (a.1) further includes:
(a.1.1) accessing said network sites at predetermined times.

30. The method of claim 21, wherein step (a.1) further includes:
(a.1.1) retrieving a modified license form based on said modified license form having a checksum other than a checksum of a version of a corresponding form previously obtained.

* * * * *